US012053131B2

(12) United States Patent
Nguyen et al.

(10) Patent No.: US 12,053,131 B2
(45) Date of Patent: Aug. 6, 2024

(54) CARPET EXTRACTOR

(71) Applicant: BISSELL Inc., Grand Rapids, MI (US)

(72) Inventors: Tom Minh Nguyen, Grand Rapids, MI (US); Thomas E. Wiedmaier, Portland, OR (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

(21) Appl. No.: 18/237,958

(22) Filed: Aug. 25, 2023

(65) Prior Publication Data

US 2023/0404349 A1 Dec. 21, 2023

Related U.S. Application Data

(60) Continuation of application No. 17/501,422, filed on Oct. 14, 2021, now Pat. No. 11,771,286, which is a continuation of application No. 17/174,883, filed on Feb. 12, 2021, now Pat. No. 11,166,610, which is a continuation of application No. 17/089,140, filed on Nov. 4, 2020, now Pat. No. 10,980,386, which is a
(Continued)

(51) Int. Cl.

| | |
|---|---|
| ***A47L 11/40*** | (2006.01) |
| ***A47L 11/30*** | (2006.01) |
| ***A47L 11/32*** | (2006.01) |
| ***A47L 11/34*** | (2006.01) |
| ***G06Q 90/00*** | (2006.01) |
| *A47L 9/04* | (2006.01) |

(52) U.S. Cl.

CPC ............. *A47L 11/302* (2013.01); *A47L 11/32* (2013.01); *A47L 11/34* (2013.01); *A47L 11/4005* (2013.01); *A47L 11/4016* (2013.01); *A47L 11/4025* (2013.01); *A47L 11/4041* (2013.01); *A47L 11/4044* (2013.01); *A47L 11/4069* (2013.01); *A47L 11/408* (2013.01); *A47L 11/4083* (2013.01); *A47L 11/4088* (2013.01); *A47L 11/4091* (2013.01); *G06Q 90/00* (2013.01); *A47L 9/0477* (2013.01)

(58) Field of Classification Search

CPC ........ A47L 11/302; A47L 11/32; A47L 11/34; A47L 11/4005; A47L 11/4016; A47L 11/4025; A47L 11/4041; A47L 11/4044; A47L 11/4069; A47L 11/408; A47L 11/4083; A47L 11/4088; A47L 11/4091; A47L 9/0477; A47L 9/0411; A47L 11/202; G06Q 90/00

See application file for complete search history.

(56) References Cited

U.S. PATENT DOCUMENTS

| | | | |
|---|---|---|---|
| 5,901,408 | A | 5/1999 | Miller et al. |
| 2001/0039684 | A1 | 11/2001 | Kasper et al. |
| 2003/0226228 | A1 | 12/2003 | Symensma et al. |

FOREIGN PATENT DOCUMENTS

| | | | |
|---|---|---|---|
| CN | 1744841 | A | 3/2006 |
| DE | 10155616 | A1 | 6/2002 |

(Continued)

*Primary Examiner* — David Redding

(74) *Attorney, Agent, or Firm* — Warner Norcross + Judd LLP

(57) ABSTRACT

A surface cleaning apparatus, such as a carpet extractor, includes a fluid recovery system for drawing dirty cleaning fluid from a surface to be cleaned. The fluid recovery system includes a recovery tank with a removable lid that has a handle that is pivotally mounted to the lid and is configured to releasably lock the lid to the tank and to assist in removing the lid from the tank.

20 Claims, 29 Drawing Sheets

Related U.S. Application Data continuation of application No. 15/903,233, filed on Feb. 23, 2018, now Pat. No. 10,827,894, which is a continuation of application No. 15/250,203, filed on Aug. 29, 2016, now Pat. No. 9,918,604, which is a continuation of application No. 15/085,444, filed on Mar. 30, 2016, now abandoned, which is a division of application No. 13/578,960, filed as application No. PCT/US2011/024741 on Feb. 14, 2011, now Pat. No. 9,380,921.

(60) Provisional application No. 61/304,625, filed on Feb. 15, 2010.

(56) References Cited

FOREIGN PATENT DOCUMENTS

| | | | |
|---|---|---|---|
| EP | 1219220 | A1 | 7/2002 |
| EP | 1352603 | A1 | 10/2003 |
| EP | 1818001 | A2 | 8/2007 |
| EP | 1917898 | A1 | 5/2008 |
| EP | 2080467 | A2 | 7/2009 |
| GB | 296978 | A | 9/1929 |
| WO | 2009018676 | A1 | 2/2009 |

CARPET EXTRACTOR

CROSS REFERENCE TO RELATED APPLICATIONS

This application is a continuation of U.S. patent application Ser. No. 17/501,422, filed Oct. 14, 2021, now U.S. Pat. No. 11,771,286, issued Oct. 3, 2023 which is a continuation of U.S. patent application Ser. No. 17/174,883, filed Feb. 12, 2021, now U.S. Pat. No. 11,166,610, issued Nov. 9, 2021, which is a continuation of U.S. patent application Ser. No. 17/089,140, filed Nov. 4, 2020, now U.S. Pat. No. 10,980,386, issued Apr. 20, 2021, which is a continuation of U.S. patent application Ser. No. 15/903,233, filed Feb. 23, 2018, now U.S. Pat. No. 10,827,894, issued Nov. 10, 2020, which is a continuation of U.S. patent application Ser. No. 15/250,203, filed Aug. 29, 2016, now U.S. Pat. No. 9,918,604, issued Mar. 20, 2018, which is a continuation of U.S. patent application Ser. No. 15/085,444, filed Mar. 30, 2016, now abandoned, which is a divisional of U.S. patent application Ser. No. 13/578,960, filed Aug. 14, 2012, now U.S. Pat. No. 9,380,921, issued Jul. 5, 2016, which is a National Phase application of International Application No. PCT/US2011/024741, filed Feb. 14, 2011, which claims the benefit of U.S. Provisional Patent Application No. 61/304,625, filed Feb. 15, 2010, all of which are incorporated herein by reference in their entirety.

BACKGROUND

Upright extractors are known for deep cleaning carpets and other fabric surfaces, such as upholstery. Most carpet extractors comprise a fluid delivery system, a fluid recovery system, and, optionally, an agitation system. The fluid delivery system typically includes one or more fluid supply tanks for storing a supply of cleaning fluid, a fluid distributor for applying the cleaning fluid directly to the surface to be cleaned or to an intermediate cleaning member that subsequently contacts the surface to be cleaned, and a fluid supply conduit for delivering the cleaning fluid from the fluid supply tank to the fluid distributor. The fluid recovery system typically comprises a recovery tank, a nozzle adjacent the surface to be cleaned (or in contact with an intermediate cleaning member in direct contact with the surface to be cleaned) and in fluid communication with the recovery tank through a working air conduit, and a vacuum source in fluid communication with the working air conduit to draw the cleaning fluid from the surface to be cleaned through the nozzle and the working air conduit to the recovery tank. The agitation system can include an agitator element for scrubbing the surface to be cleaned, an optional drive means, and selective control means. The agitation system can include a fixed or driven agitator element that can comprise a brush, pad, sponge, cloth, and the like. The agitation system can also include driving and control means including motors, turbines, belts, gears, switches, sensors, and the like. An example of an upright extractor is disclosed in commonly assigned U.S. Pat. No. 6,131,237 to Kasper et al.

U.S. Pat. No. 6,662,402 to Giddings et al. discloses a soil transfer extraction cleaning method employing a roller assembly including a soil transfer cleaning medium to mechanically remove soil from the surface to be cleaned. The method includes the steps of successively and repeatedly wetting a portion of the cleaning medium with a cleaning liquid, extracting any soil and at least some of the cleaning liquid from the previously wetted portion of the cleaning medium, and wiping the surface to be cleaned with the cleaning medium so as to transfer soil from the surface to be cleaned to the cleaning medium.

U.S. Pat. No. 6,735,812 to Hekman et al. discloses an apparatus having a cleaning implement in selective wiping contact with the surface to be cleaned; a cleaning solution dispenser that selectively wets a portion of the cleaning implement, a portion of the surface to be cleaned, or both; a first selectively controllable vacuum extractor tool to remove some of the dispensed cleaning solution and soil from the cleaning implement; and a second selectively controllable vacuum extractor tool which removes soil and some of the cleaning solution directly from the surface to be cleaned.

Traditionally, carpet extractors deliver cleaning fluid directly to a surface to be cleaned or onto an agitation system which subsequently delivers the cleaning solution to the surface to be cleaned. In both cases, the surface to be cleaned is saturated with cleaning fluid and allowed to dwell for a sufficient time to maximize the efficiency of the chemical process. In a second step, the cleaning solution together with any entrained debris is removed from the surface to be cleaned and collected via the fluid recovery system.

BRIEF DESCRIPTION

An aspect of the present disclosure relates to a carpet extractor with an open top recovery tank for collecting and storing the spent cleaning fluid and dirt removed from the surface to be cleaned, the recovery tank including an upper rim around the open top and a pair of opposed, outwardly projecting cam followers on the exterior sides of the recovery tank adjacent the rim, a lid having a lower rim that mates with the recovery tank upper rim to close the open top of the recovery tank and a pair of journals, a U-shaped handle rotatably mounted to the lid between a closed position and an open position, the handle having at its outer ends two opposed cam mounting sockets that each have a cam surface and a socket on the interior face thereof, and the handle is rotatably mounted to the lid by the sockets and the journals, and wherein the handle cam surfaces are configured and adapted to interface with the recovery tank cam followers releasably lock the lid to the recovery tank when the handle is in the closed position and to release the lid from the recovery tank and to raise the lid slightly from the recovery tank when the handle is in the open position.

Another aspect of the present disclosure relates to a carpet extractor including a recovery tank for collecting and storing the spent cleaning fluid and dirt removed from the surface to be cleaned, the recovery tank including an open top, an upper rim around the open top, and a pair of cam followers adjacent the rim, the cam followers projecting outwardly from exterior sides of the recovery tank in opposite directions, a lid comprising a pair of journals and a lower rim that mates with the upper rim of the recovery tank to close the open top of the recovery tank, and a handle rotatably mounted to the lid via the pair of journals and rotatable between a closed position and an open position, the handle comprising a pair of cam surfaces, wherein the cam surfaces are configured to interface with the cam followers to releasably lock the lid to the recovery tank when the handle is in the closed position and to raise the lid slightly from the recovery tank and release the lid from the recovery tank when the handle is in the open position.

Yet another aspect of the present disclosure relates to a carpet extractor including a recovery tank for collecting and storing spent cleaning fluid and dirt removed from a surface to be cleaned, the recovery tank including an open top, an upper rim around the open top, and a plurality of cam followers adjacent the rim, the cam followers projecting outwardly from exterior sides of the recovery tank in opposite directions, a lid comprising a plurality of journals and a lower rim that mates with the upper rim of the recovery tank to close the open top of the recovery tank, and a handle rotatably mounted to the lid via the plurality of journals and rotatable between a closed position and an open position, the handle comprising a plurality of cam surfaces, wherein the cam followers ride along the cam surfaces during rotation of the handle between the closed position and the open position, wherein the cam surfaces are configured to interface with the cam followers to releasably lock the lid to the recovery tank when the handle is in the closed position and to raise the lid from the recovery tank and release the lid from the recovery tank when the handle is in the open position, and wherein the cam surfaces are configured to urge the raising of the lid from the recovery tank as the cam followers ride along the cam surfaces during a rotation of the handle to the open position.

DETAILED DESCRIPTION

The present disclosure relates to an upright deep cleaner for delivering cleaning fluid to a surface to be cleaned and removing the cleaning fluid from the surface to be cleaned. In one of its aspects, the present disclosure relates to an extractor rental method that includes packaged single use chemicals for use with a rental unit.

Figure 1:
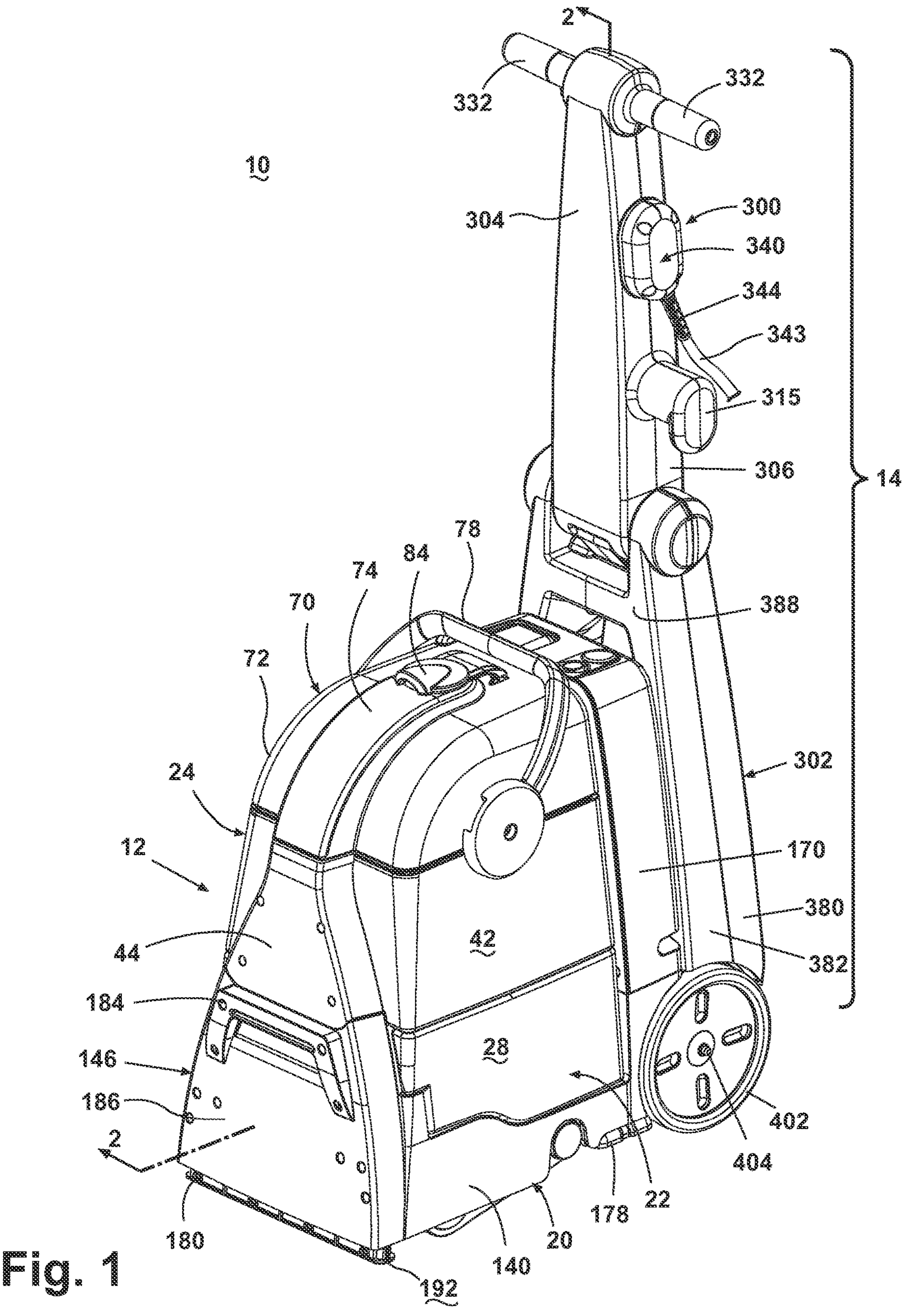
FIG. 1 is a front, right perspective view of a deep cleaner according to the invention with a handle assembly pivotally mounted to a base assembly.
Figure 2:
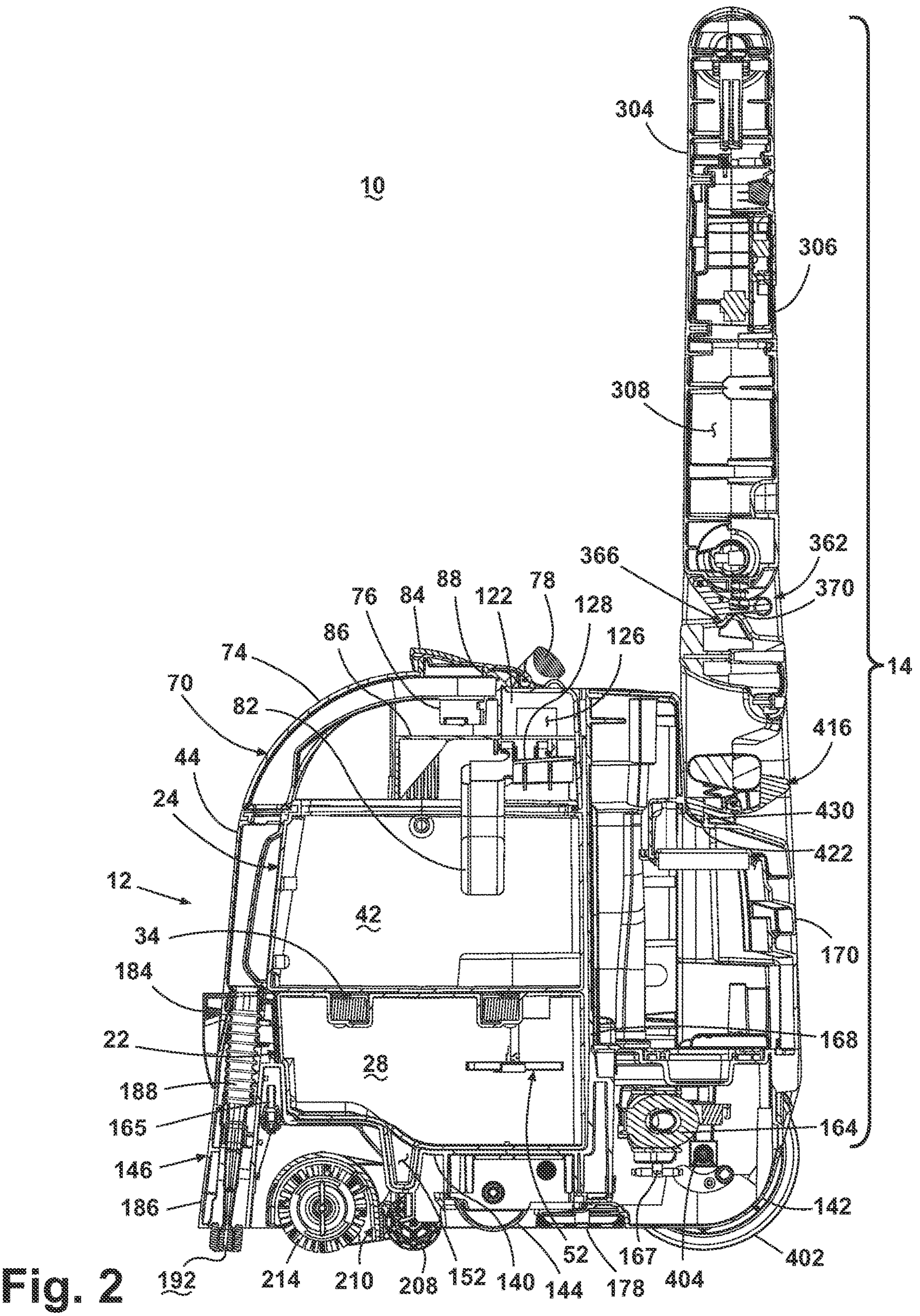
FIG. 2 is a cross-sectional view of the deep cleaner taken along line 2-2 of FIG. 1.

Referring to the drawings, and particularly to FIGS. 1-2, an upright deep cleaner 10 according to the present disclosure includes a housing having a base assembly 12 for movement across a surface to be cleaned and a handle assembly 14 pivotally mounted to a rearward portion of the base assembly 12 for directing the base assembly 12 across the surface to be cleaned. The deep cleaner 10 includes a fluid delivery system for storing cleaning fluid and delivering the cleaning fluid to the surface to be cleaned and a fluid recovery system for removing the spent cleaning fluid and dirt from the surface to be cleaned and storing the spent cleaning fluid and dirt. The components of the fluid delivery system and the fluid recovery system are supported by at least one of the base assembly 12 and the handle assembly 14.

The base assembly 12 includes a base platform 20 that supports a solution supply tank assembly 22 at a forward portion thereof, forward being defined as relative to the mounting location of the handle assembly 14 on the base assembly 12. A recovery tank assembly 24 is removably mounted on top of the solution supply tank assembly 22.

The Solution Supply Tank

Figure 3:
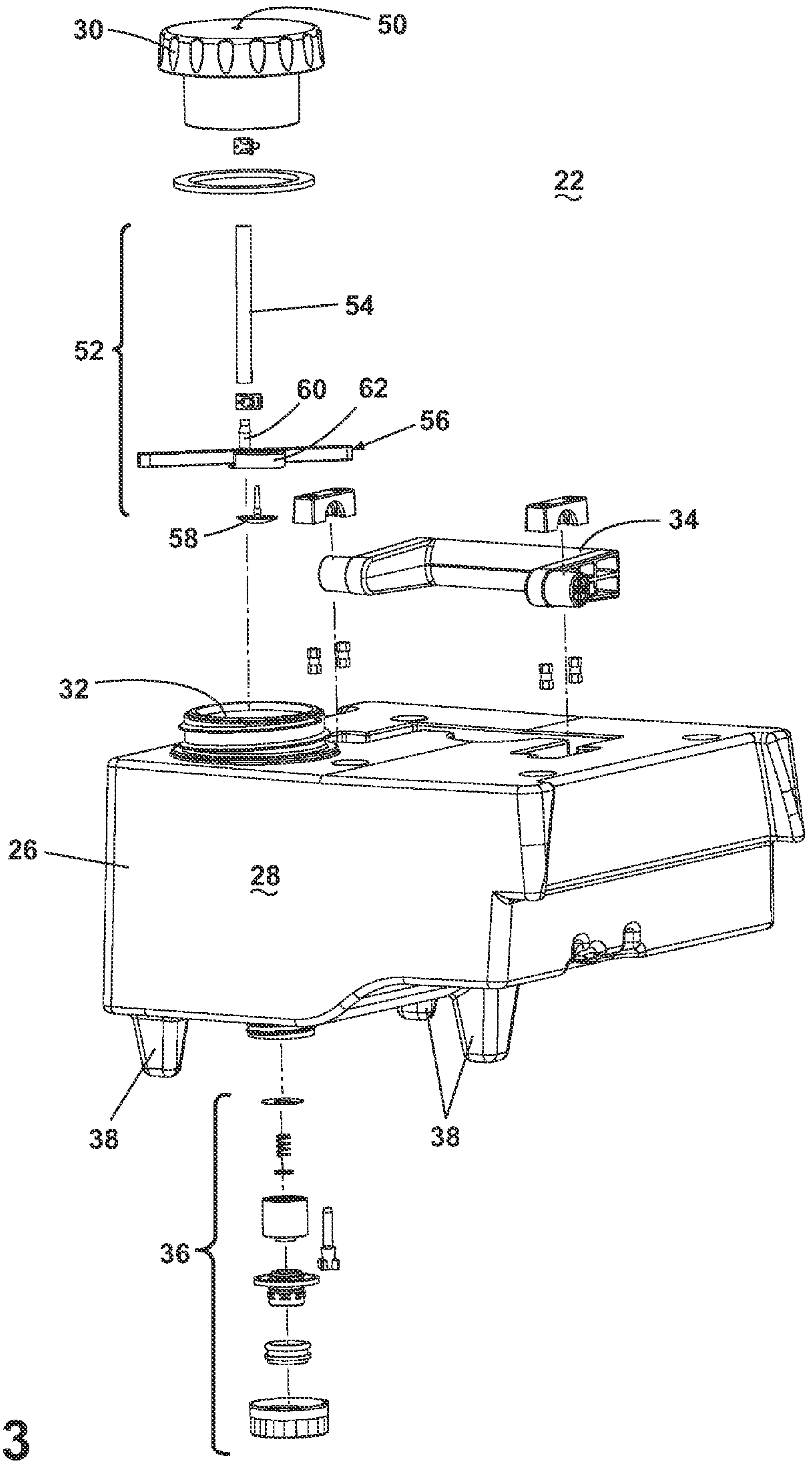
FIG. 3 is an exploded view of a solution supply tank assembly of the deep cleaner of FIG. 1.

Referring additionally to FIG. 3, the solution supply tank assembly 22 includes a generally cubic solution tank 26, which defines a cleaning fluid supply chamber 28 for storing a quantity of cleaning fluid. The solution supply tank assembly 22 further includes a fill cap 30 that is fastened to a threaded inlet 32 of the solution tank 26, a carry handle 34 that is recessed into the solution tank 26, a valve 36, and multiple stand-off feet 38 located on a bottom surface thereof. Because the bottom surface of the solution tank 26 is not planar, the stand-off feet 38 level the solution tank 26 when it is removed from the base assembly 12 and set on a flat surface. The stand-off feet 38 are each received in a corresponding depression 152 (FIG. 8) in the base platform 20. The depressions 152 merely function as a space to accommodate the stand-off feet 38 and do not function to secure the solution tank 26 to the base assembly 12. The valve 36 is received in a valve seat 154 (FIG. 8) in the base platform 20. The solution tank 26 is filled with cleaning solution via inlet 32, and is selectively removed from the base assembly 12 by the carry handle 34.

The fill cap 30 includes an inlet hole 50 in the top surface. Further, the fill cap 30 is retained to the solution tank 26 by a tether 52, which includes a hollow tether tube 54, a tether base 56, and a check valve 58. The upper end of the tether tube 54 is affixed to a nipple (not shown) located on the interior side of the fill cap 30 top surface. The lower end of the tether tube 54 is affixed to a nipple 60 located at a center portion 62 of the tether base 56. The check valve 58 is positioned on the underside of the center portion 62, below the nipple 60.

The Recovery Tank Assembly

Figure 4:
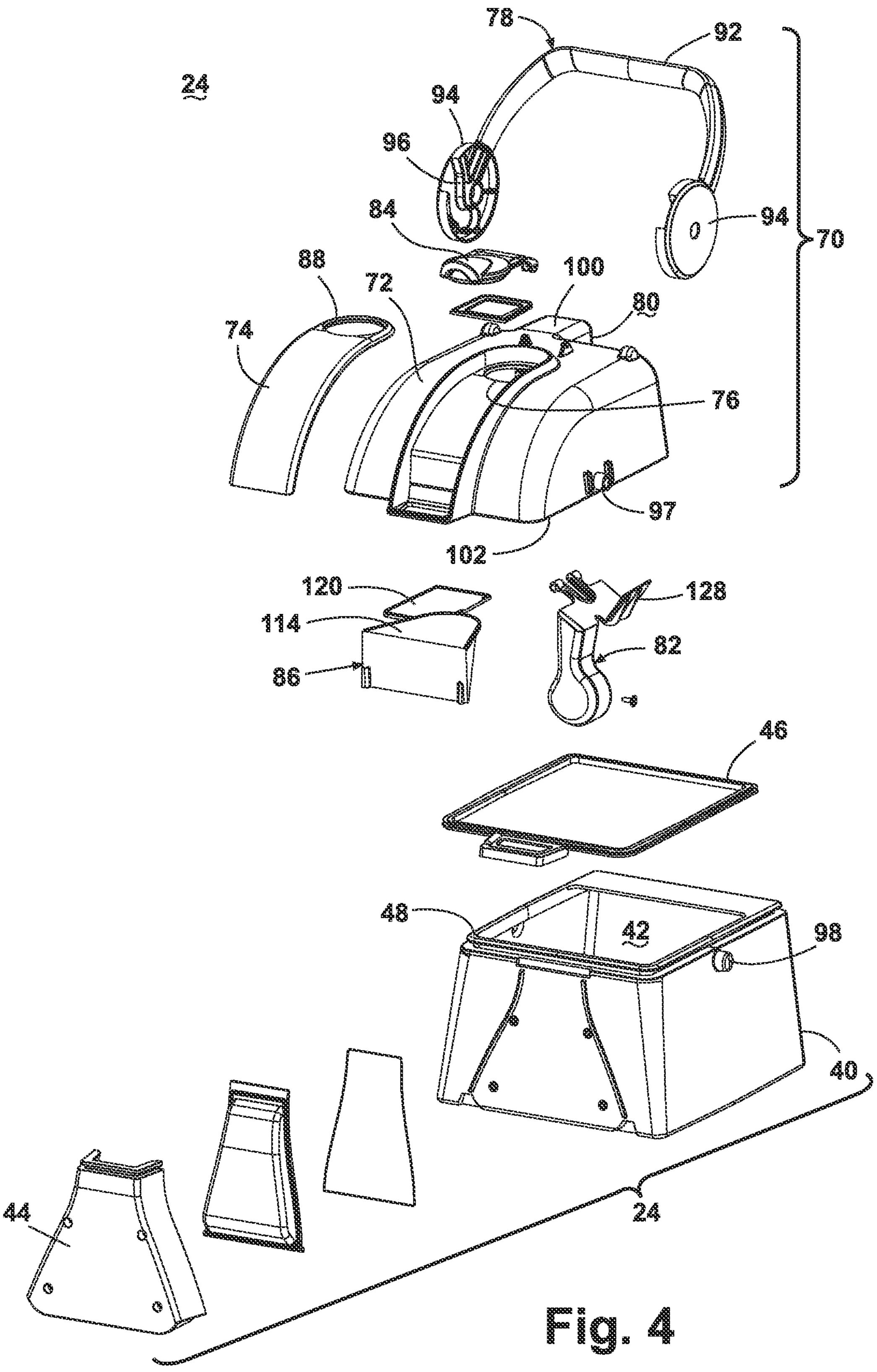
FIG. 4 is an exploded view of a recovery tank assembly and a lid assembly of the deep cleaner of FIG. 1.

Referring to FIG. 4, the recovery tank assembly 24 includes a generally cubic tank housing 40 with an open top defined by an upper rim 48 and covered by a removable lid assembly 70. The tank housing 40 defines a recovery chamber 42 sized to receive a quantity of spent cleaning solution and dirt. The recovery tank assembly 24 includes a nozzle conduit section 44 on its forward face, and a lid seal 46 for sealing the tank housing 40 at the upper rim 48 and the lid assembly 70. In one example, the lid seal 46 is formed by a commonly known resilient elastomeric rope material that is placed between the tank housing 40 upper rim 48 and the tank lid assembly 70. In another example, the lid seal 46 is a single piece formed of a resilient elastomeric material to effectively seal the recovery chamber 42 from air and water leaks. It is contemplated that the surface of the tank housing 40 be fluorinated for maximum hydrophobicity. Fluorination discourages the collection of water on the contact surface, which assists in the prevention of microbial growth and associated malodors. It is further contemplated that antimicrobial compounds, such as commercially available Microban®, for example, or fragrances may be integrated into the plastic resin material forming the tank housing 40 and associated components. The molded-in antimicrobial or fragrance additives deter bacterial growth and malodors, thereby maintaining a clean and fresh smelling deep cleaner 10.

Figure 5:
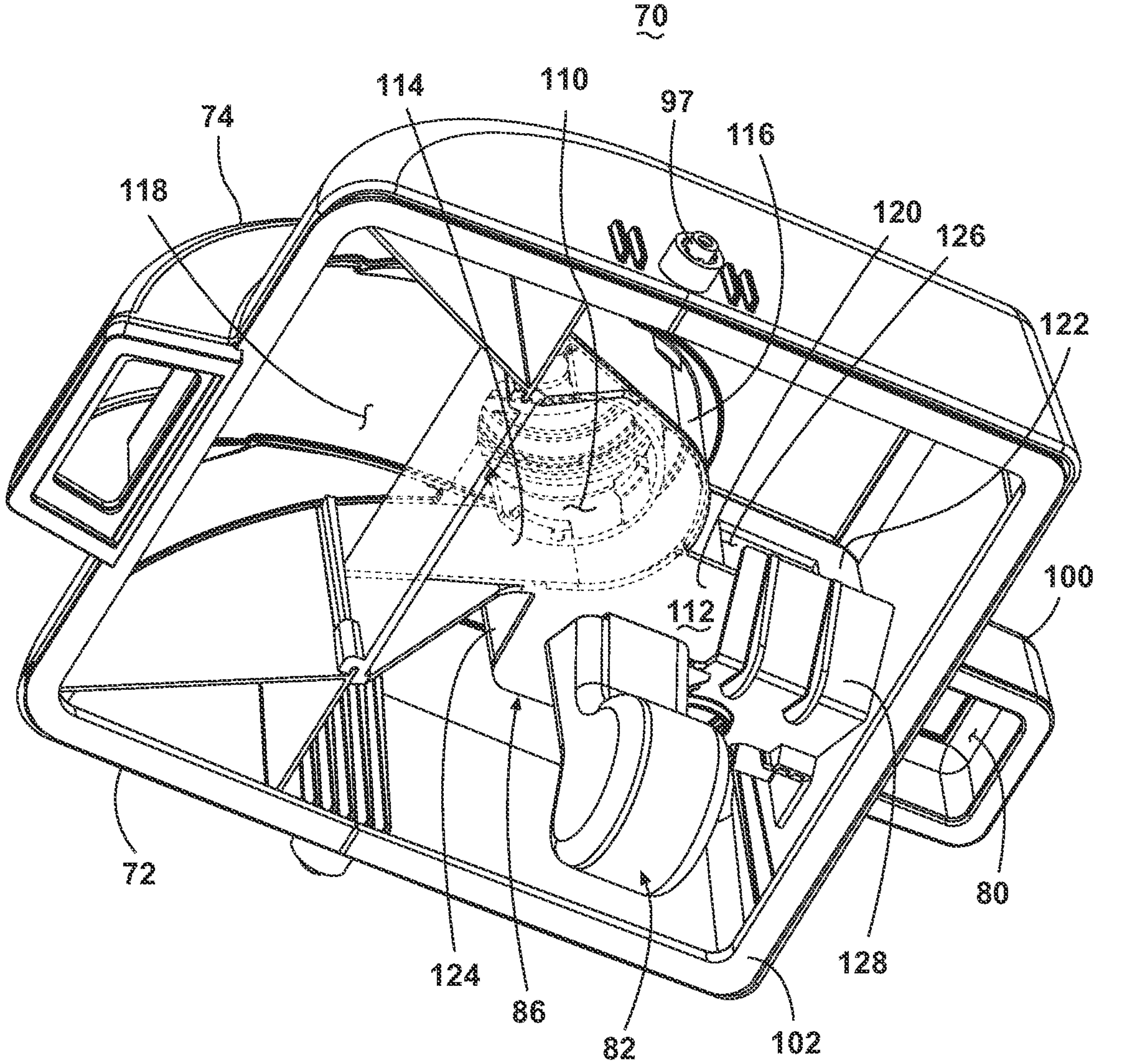
FIG. 5 is a front perspective view of the underside of the lid assembly of FIG. 4.
Figure 6:
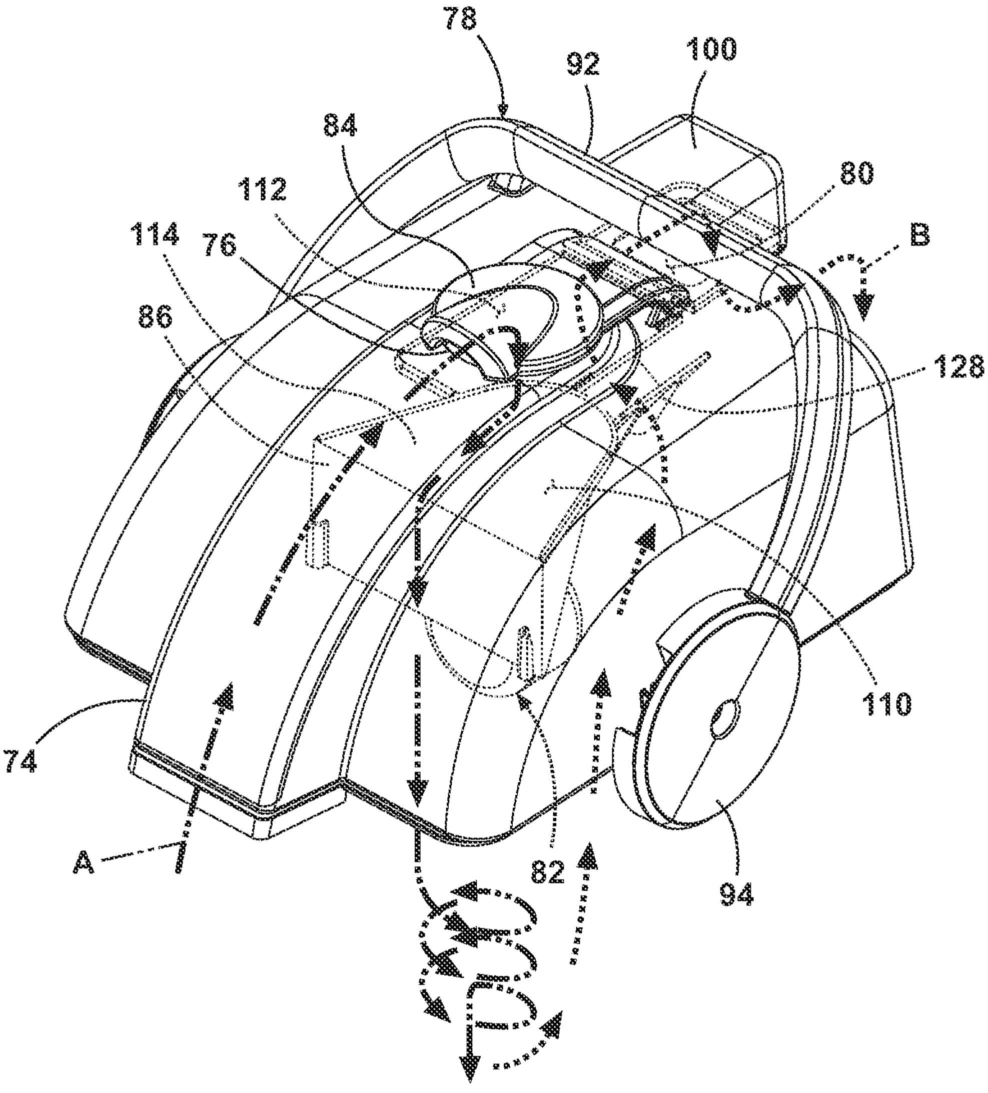
FIG. 6 is a front perspective view of the lid assembly of FIG. 4 and illustrating an air and fluid circulation path.
Figure 7:
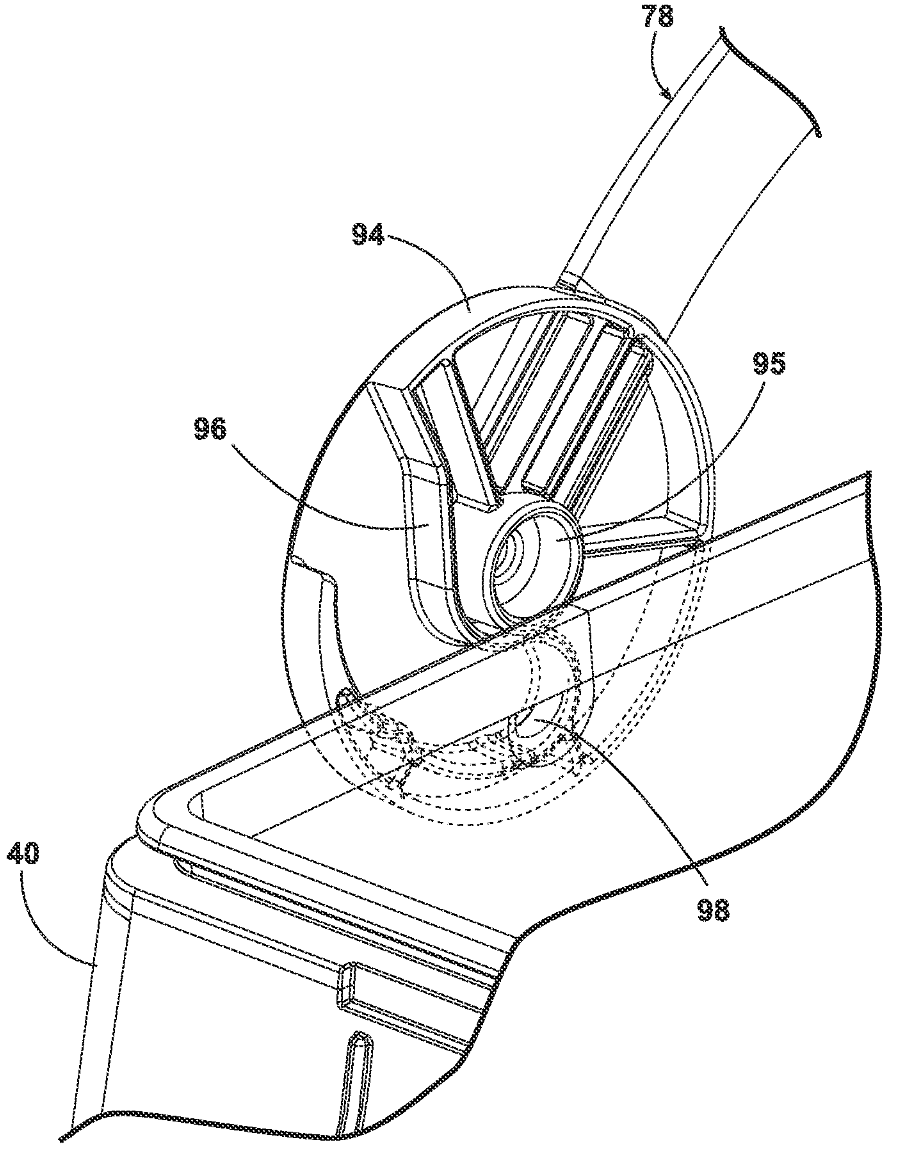
FIG. 7 is a detail view of a carry handle of the lid assembly and the recovery tank assembly of FIG. 4, illustrating the lid attachment.

Referring additionally to FIGS. 5-7, the lid assembly 70 includes a lid 72 with a lower rim 102, a recovery tank inlet conduit 74, an inlet 76 to the recovery chamber 42, a carry handle 78, a recovery tank outlet 80, a float 82, a hose cap 84, and an air/fluid separator plate 86. The recovery tank inlet conduit 74 overlies and is fixed to the upper surface of the lid 72 by any commonly known and suitable means such as sonic welding, adhesive, or the like. Together, the recovery tank inlet conduit 74 and the lid 72 form an arched fluid flow path therebetween. The recovery tank inlet conduit 74 also includes an accessory hose flow aperture 88 which is selectively covered by the hose cap 84. For above-floor cleaning, an accessory hose 90 (FIG. 22) is snapped in to the accessory hose flow aperture 88, as disclosed, for example, in U.S. Pat. No. 6,134,744, which is incorporated herein by reference in its entirety. Further, an aperture is formed in the lid 72 directly below the accessory hose flow aperture 88 and defines the inlet 76 to the recovery chamber 42. The lid 72 also includes an integral recovery tank conduit 100 formed in the rear wall thereof and extending beyond the generally rectangular lid 72 footprint. The recovery tank conduit 100 has a downward facing tank outlet 80.

The carry handle 78 includes a hand grip portion 92 and two opposed cam mounting sockets 94, the interior faces of which include a cam surface 96 and a socket 95, best seen in FIG. 7. The lid 72 includes a pair of opposed journals 97 located on the exterior surface of the lid 72 and to which the carry handle 78 is rotatably mounted. A pair of cam followers 98 project outward from the exterior sides of the tank housing 40 and are captured by the cam surface 96 of the carry handle 78, locking the lid assembly 70 to the recovery tank housing 40 when the carry handle 78 is rotated rearwardly. To unlock the lid assembly 70 from the recovery tank housing 40, the carry handle 78 is rotated to a forward or open position. The cam followers 98 ride along the cam surface 96 and raise the lid assembly 70 slightly from the recovery tank housing 40. The lid assembly 70 is then removed from the tank housing 40 by disengaging the cam followers 98 with the carry handle 78. This configuration provides a convenient means to disengage the lid seal 46 captured between the lid assembly 70 and the tank housing 40 to facilitate lid removal.

Referring to FIG. 5, the lid assembly 72 further includes a separator plate 86. The separator plate 86 is sealingly attached to the interior of the lid 70 thus forming an inlet chamber 110 and an outlet chamber 112. The inlet chamber 110 is defined by a bottom wall 114 of the separator plate 86 and an arcuate dividing wall 116 that depends downwardly from the interior of the lid 72. The inlet chamber 110 further includes an exit opening 118 that is formed between the lid 70 and the bottom wall 114. The inlet chamber 110 fluidly connects the recovery tank inlet 76 to the recovery chamber 42.

The outlet chamber 112 is defined by a bottom wall 120 of the separator plate 86 and two opposed side walls 122, a rear wall 124, and a portion of the dividing wall 116, all of which depend downwardly from the interior of the lid 72. The outlet chamber 112 further includes an outlet opening 126 defined by a rectangular hole in the side wall 122. The outlet chamber 112 fluidly connects the recovery chamber 42 to the recovery tank outlet 80.

The lid assembly 70 further includes a float 82. The float 82 is pivotally attached to the separator plate 86 bottom wall 120. The float 82 also includes a float door 128 that is sized to cover the outlet opening 126 of the outlet chamber 112. In the normally open position, the float 82 extends down into the recovery chamber 42 and the float door 128 is spaced from the outlet opening 126. As the fluid level increases in the recovery chamber 42, the buoyant float 82 rises with the rising fluid and pivots the float door 128. When the float door 128 reaches a predetermined angular position, airflow through the outlet chamber 112 draws the float door 128 to a vertical, closed position to seal the outlet opening 126 and block the working airpath between the outlet chamber 112 and the recovery chamber 42.

Referring to FIG. 6, the internal structure of the lid assembly 70 forms a circulation path A within the lid 72 and recovery chamber 42. The circulation path A begins at the inlet conduit 74 and flows through the upwardly arched flow path, down through the tank inlet 76 and laterally across the bottom wall 114 of the separator plate 86 before flowing down and into the recovery chamber 42. The circulation path A then proceeds laterally beneath the separator plate 86 toward the opposite side of the recovery chamber 42 and flows up and through the outlet opening 126 of the outlet chamber 112. The circulation path A then flows horizontally out of the outlet chamber 112, through the recovery tank conduit 100, and exits the lid 72 through the recovery tank outlet 80.

The Base Platform

Figure 8A:
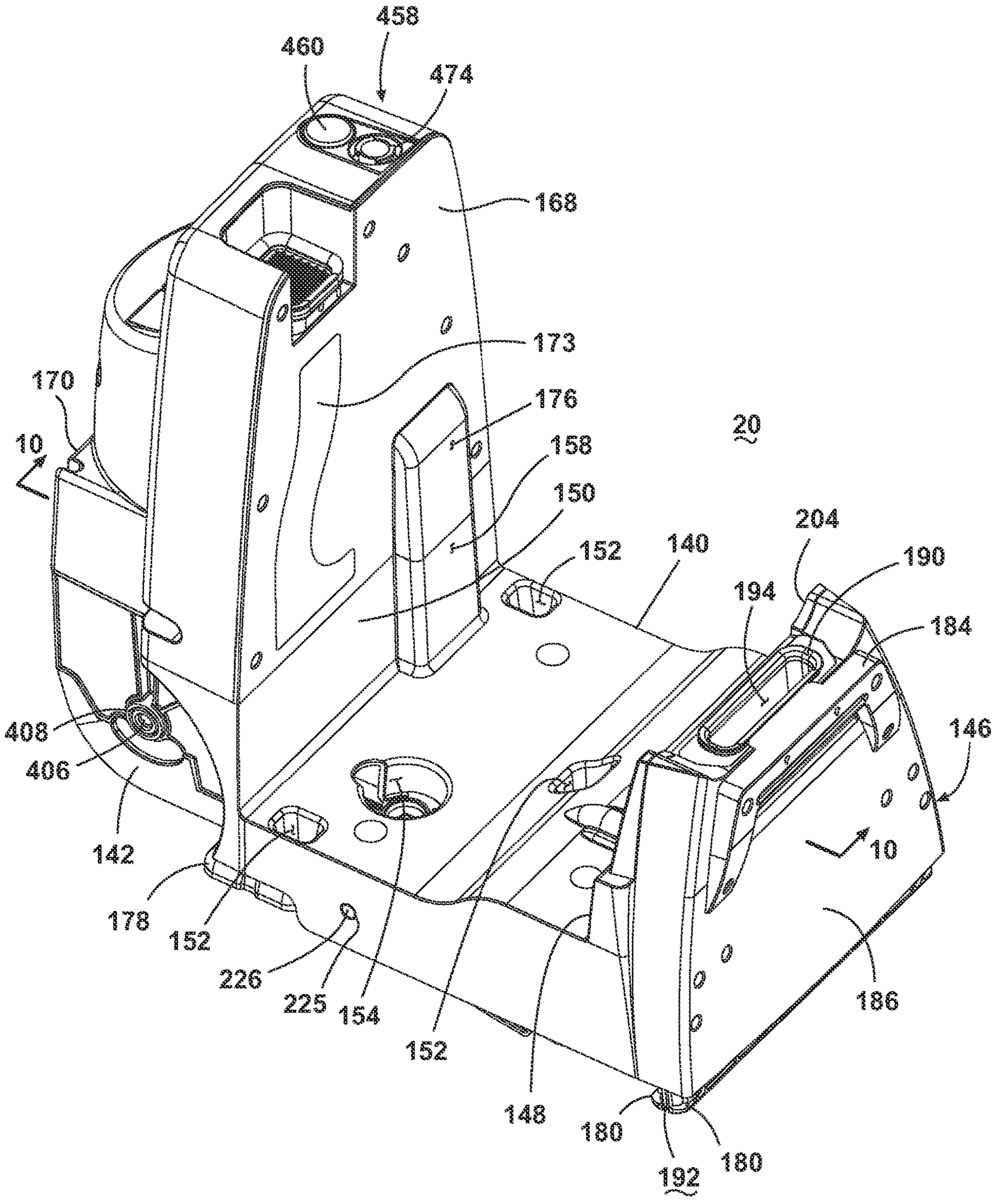
FIG. 8A is a front, left perspective view of a base platform of the deep cleaner of FIG. 1.
Figure 8B:
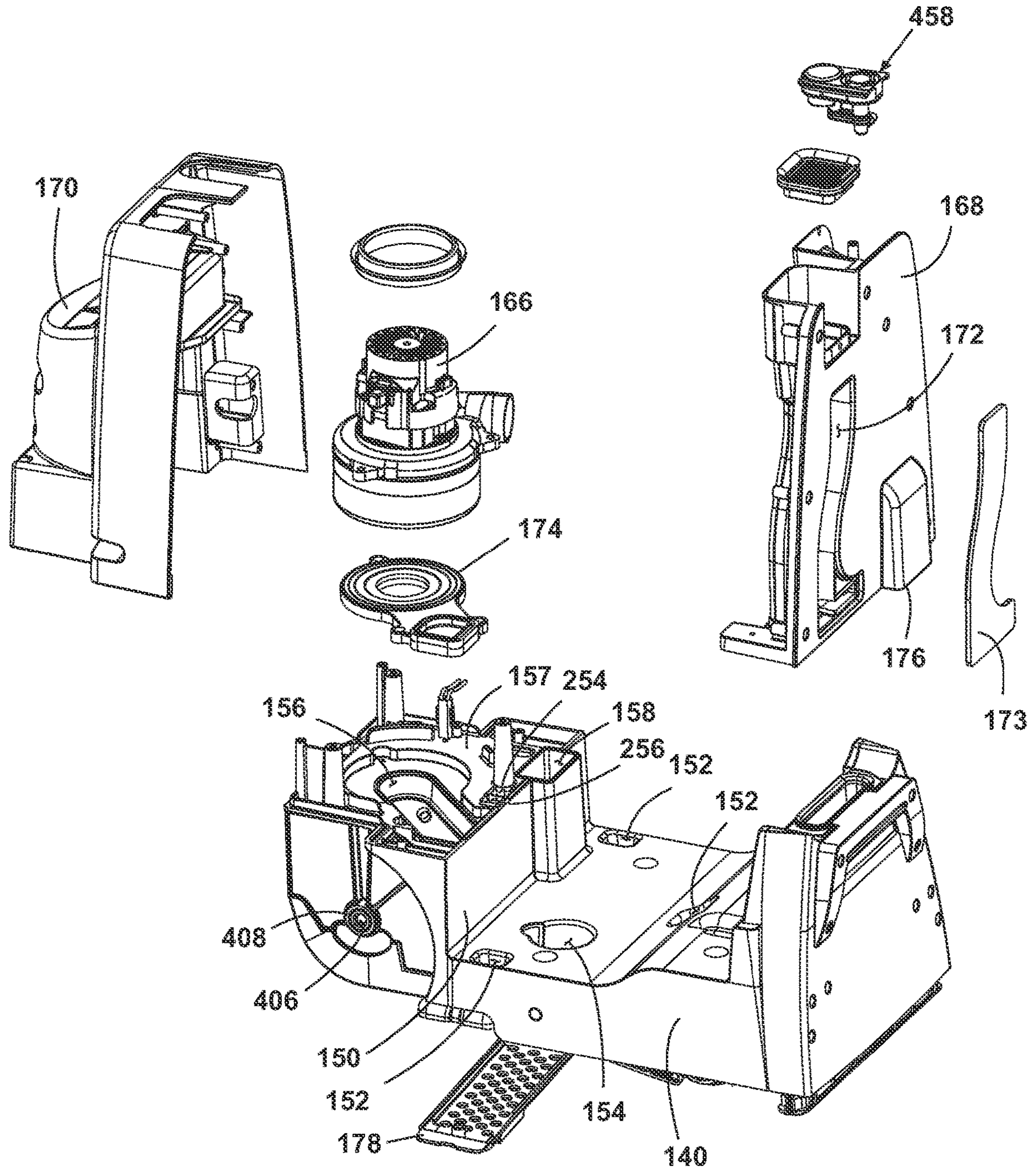
FIG. 8B is a partially exploded view of the base platform of FIG. 8A.
Figure 9:
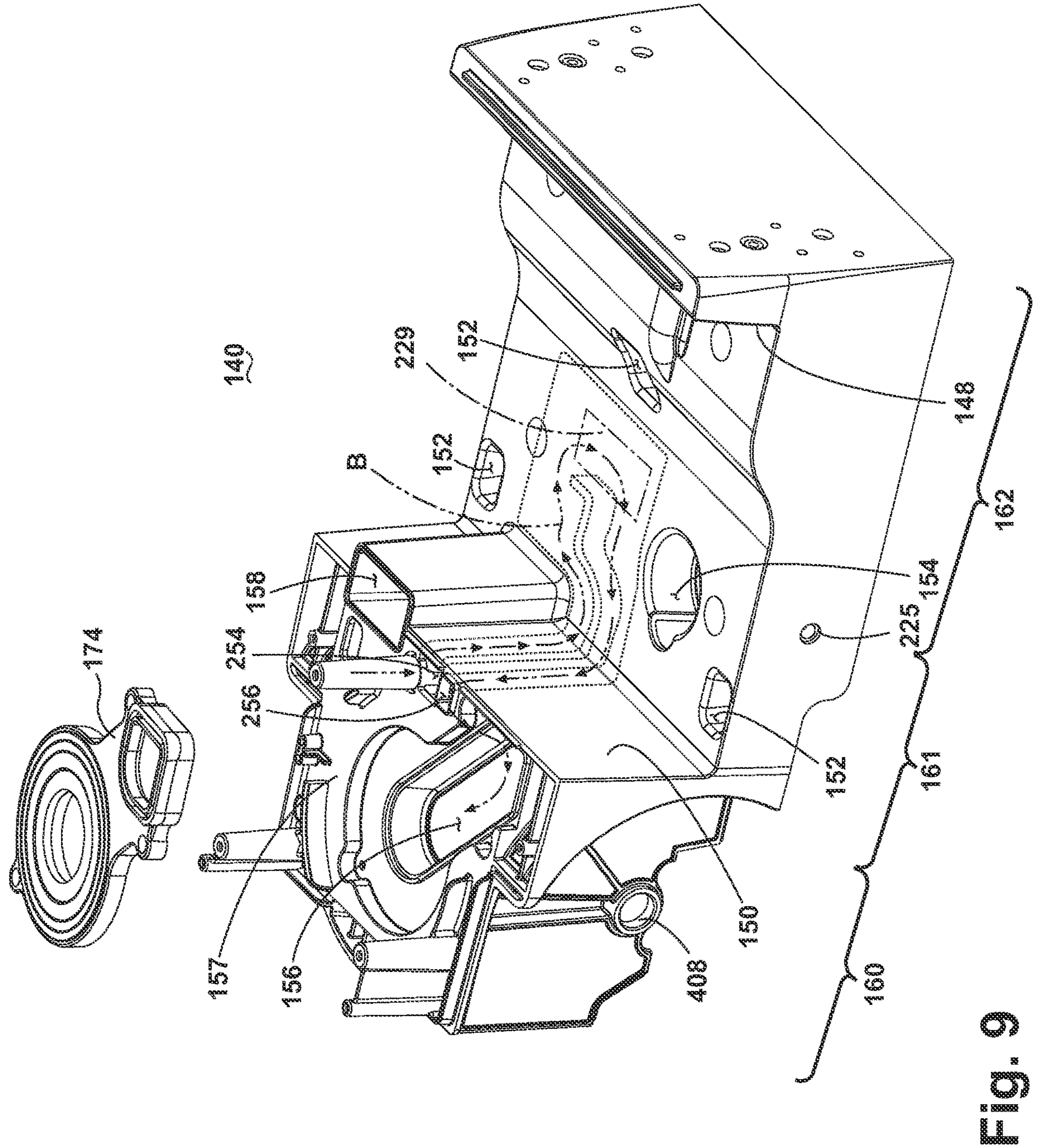
FIG. 9 is a front, left perspective view of a base housing and an air path cover from the base platform of FIG. 8, illustrating a brush motor cooling air path.
Figure 10:
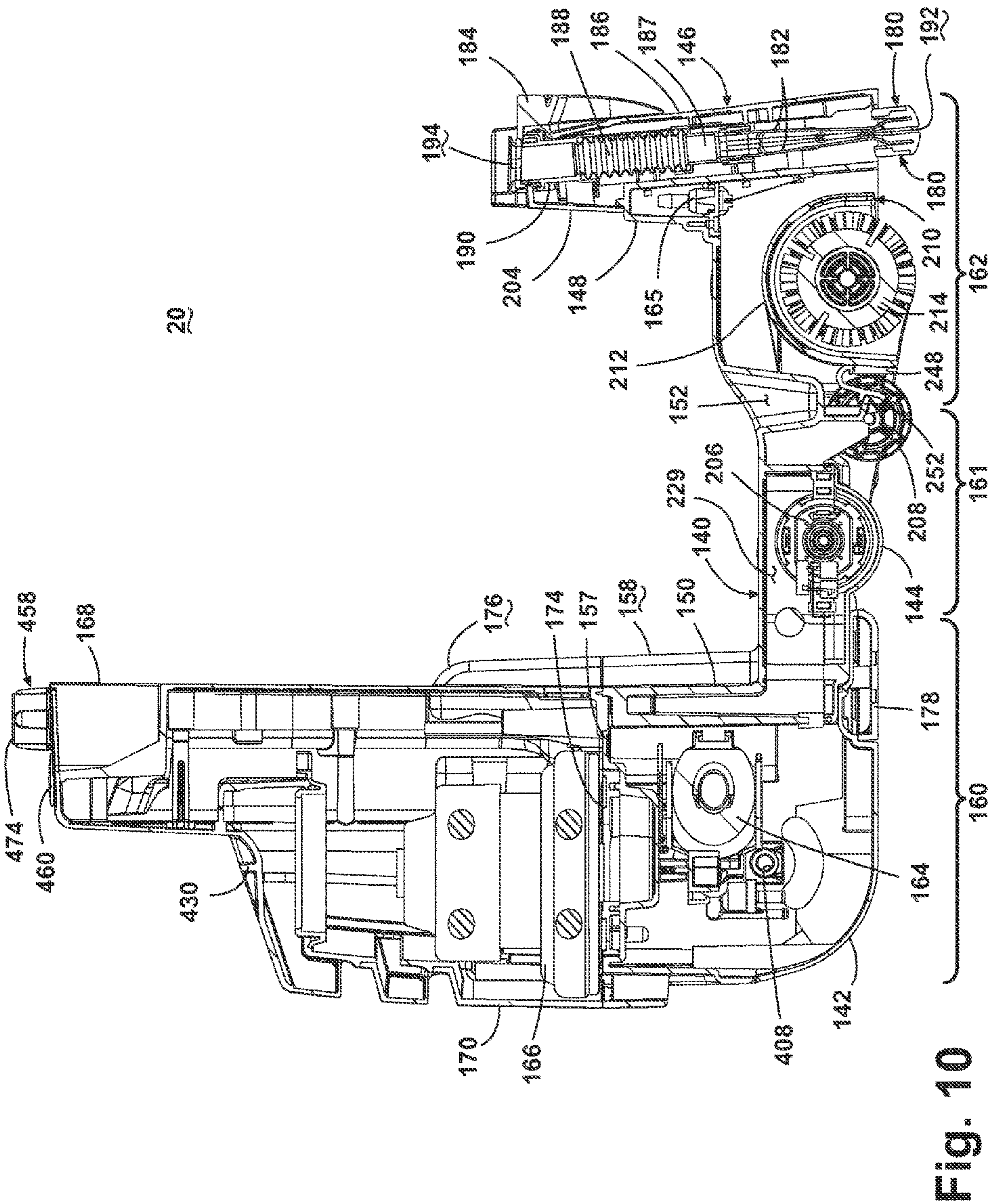
FIG. 10 is a cross-sectional view of the base platform of FIG. 8A.

Referring now to FIGS. 8-10, the base platform 20 includes a housing formed by a base housing 140, a base cover 142, a brush motor cover 144, and a floor suction nozzle assembly 146. The base housing 140 is a generally rectilinear body incorporating various internal attachment features such as bosses, ribs, and the like for attaching the components that are mounted inside the base housing 140. The base housing 140 includes a front wall 148 and a rear wall 150 between which the solution tank 26 is seated. As described above, the base housing 140 includes the depressions 152 for receiving the stand-off feet 38 and the valve seat 154 for receiving the valve 36, which is fluidly communicable with the fluid distribution system. The base housing 140 further includes an exhaust air pathway 156 and an exhaust outlet conduit 158. Additionally, the base housing 140 is described as having a rearward section 160, a center section 161, and a forward section 162.

Referring to the rearward section 160 of the base housing 140 shown in FIG. 10, a pump assembly 164 is mounted beneath a horizontal wall 157 opposing a motor and fan assembly 166 mounted to the top side. The pump assembly 164 has an outlet in fluid communication with a spray tip 165, which is mounted in the forward section 162. The motor and fan assembly 166 is the vacuum source for the deep cleaner 10. The vertically mounted motor and fan assembly 166 is enclosed in compartment formed within mating motor cover inner and outer housings 168, 170, which are secured together and mounted to the base housing 140. The motor cover inner housing 168 includes an integrally formed transfer conduit 172 that is enclosed by a transfer conduit cover 173, which together connect the recovery tank outlet 80 to the motor and fan assembly 166 via the exhaust air pathway 156 when the recovery tank assembly 24 is mounted to the base platform 20. The exhaust air pathway 156 is sealingly covered and mated to the motor and fan assembly 166 by an air path cover 174, thereby forming a portion of the fluid recovery system. The motor cover inner housing 168 further includes an exhaust duct 176 that is in fluid communication with the exhaust air outlet conduit 158 formed in the base housing 140. A perforated duct cover 178 is mounted to the underside of the base housing 140 and helps to disperse the exhaust air that passes through the exhaust air outlet conduit 158 across the width of the underside of the deep cleaner 10.

The Nozzle Assembly

Figure 11:
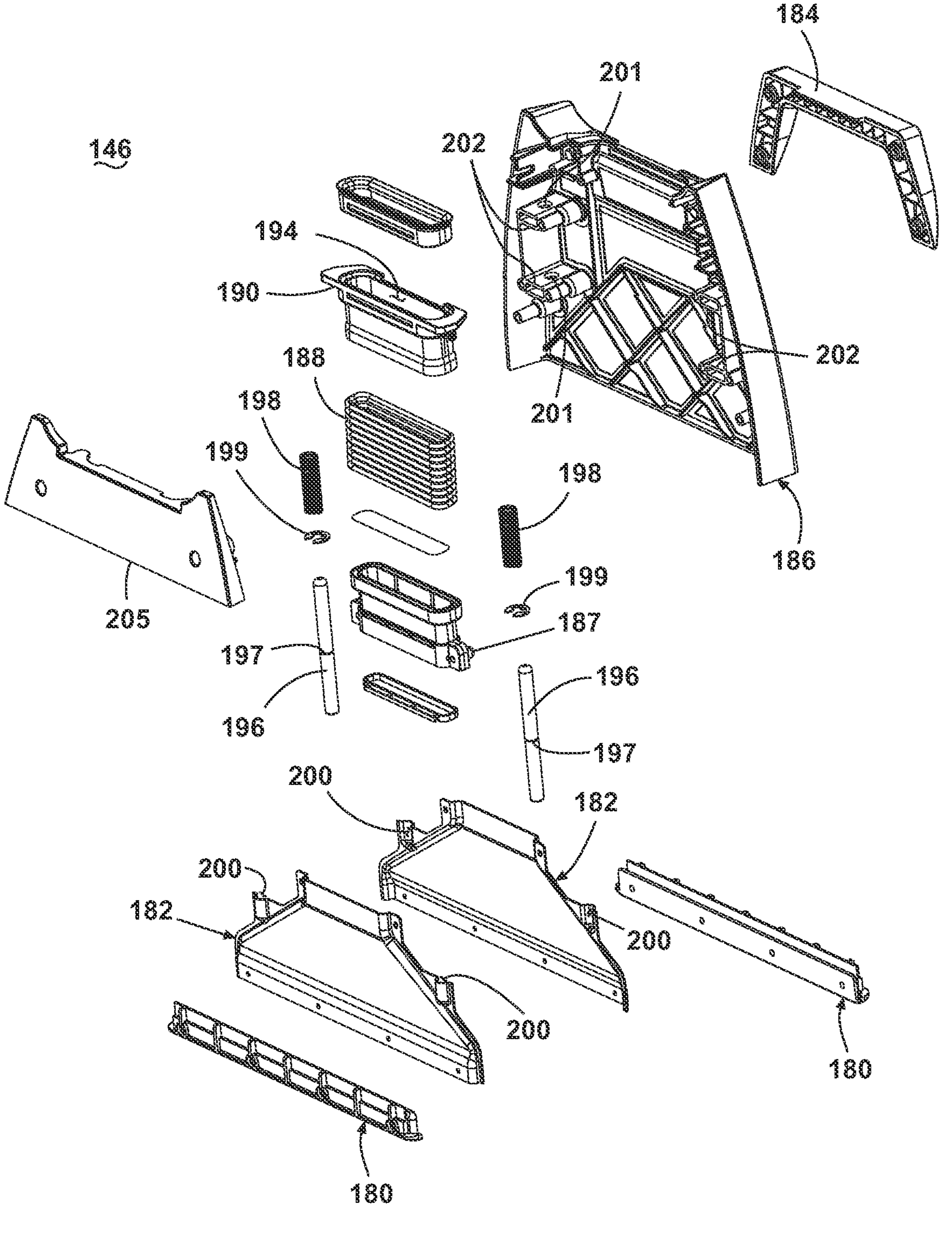
FIG. 11 is an exploded view of a nozzle assembly of the deep cleaner of FIG. 1.
Figure 12:
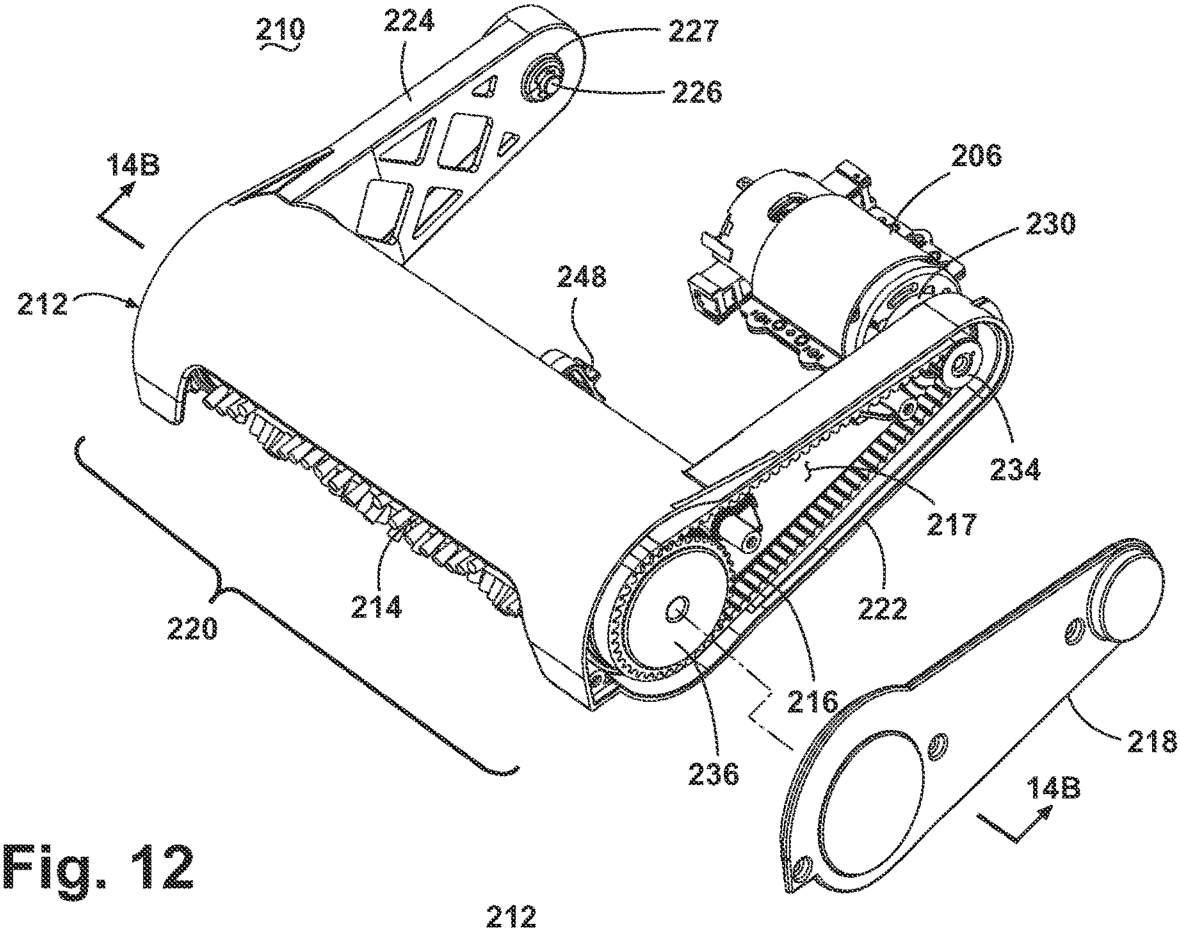
FIG. 12 is a partially exploded perspective view of a brush carriage assembly and a brush motor of the deep cleaner of FIG. 1.
Figure 13A:
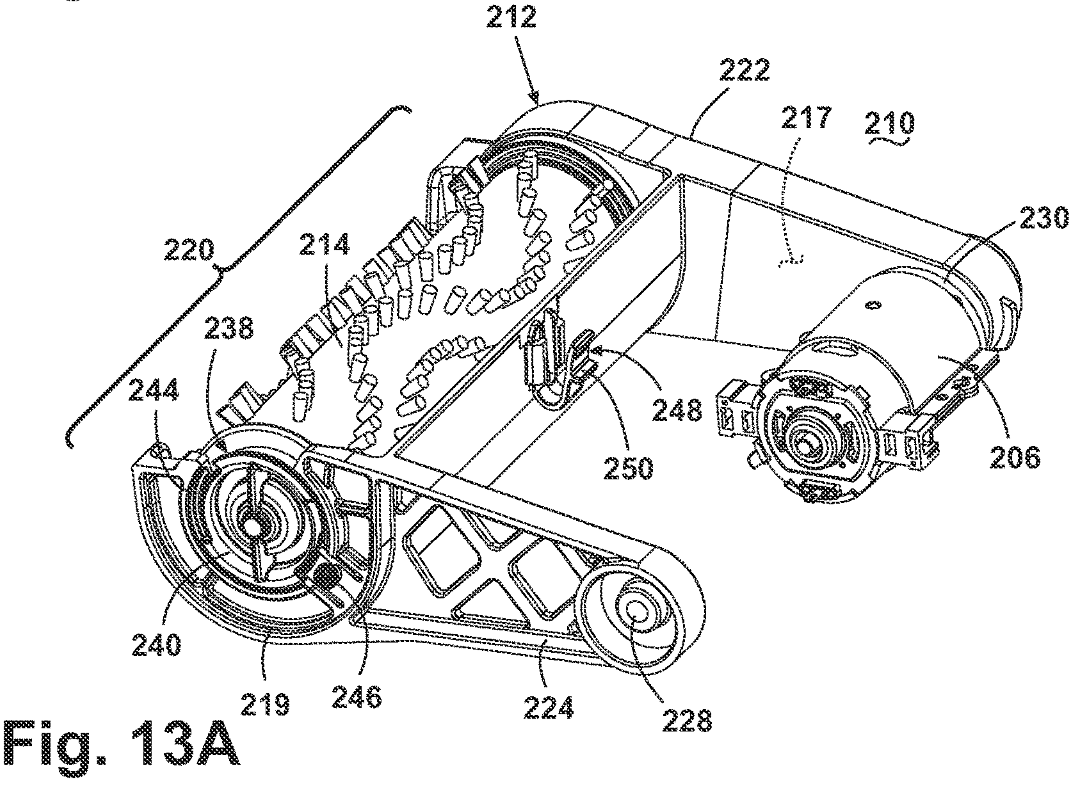
FIG. 13A is a view of the underside of the brush carriage assembly and brush motor from FIG. 12, the brush carriage assembly being rotated 180°.
Figure 13B:
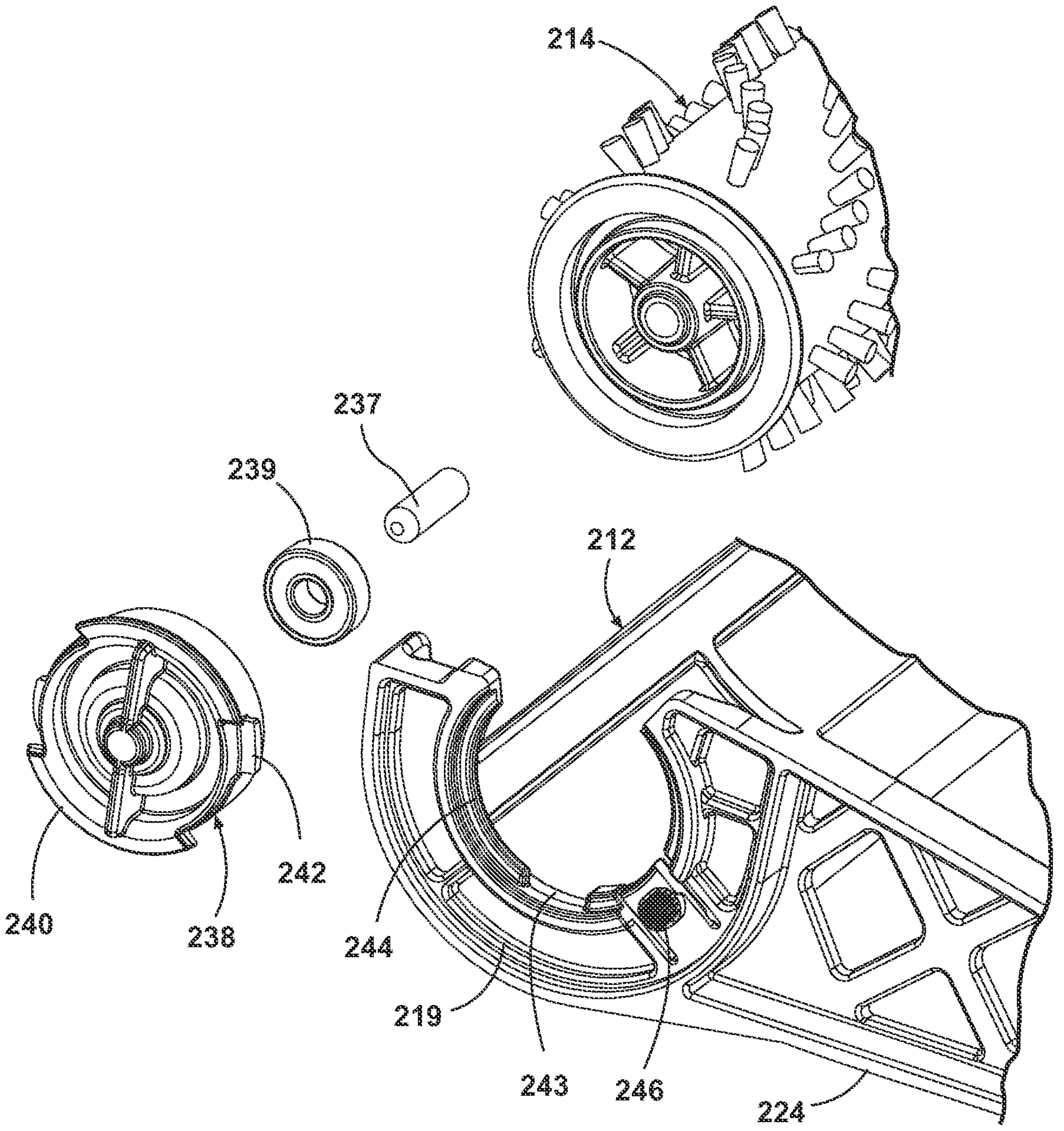
FIG. 13B is a detail, exploded view of a twist and lock connection on the brush carriage assembly of FIG. 13A.
Figure 14A:
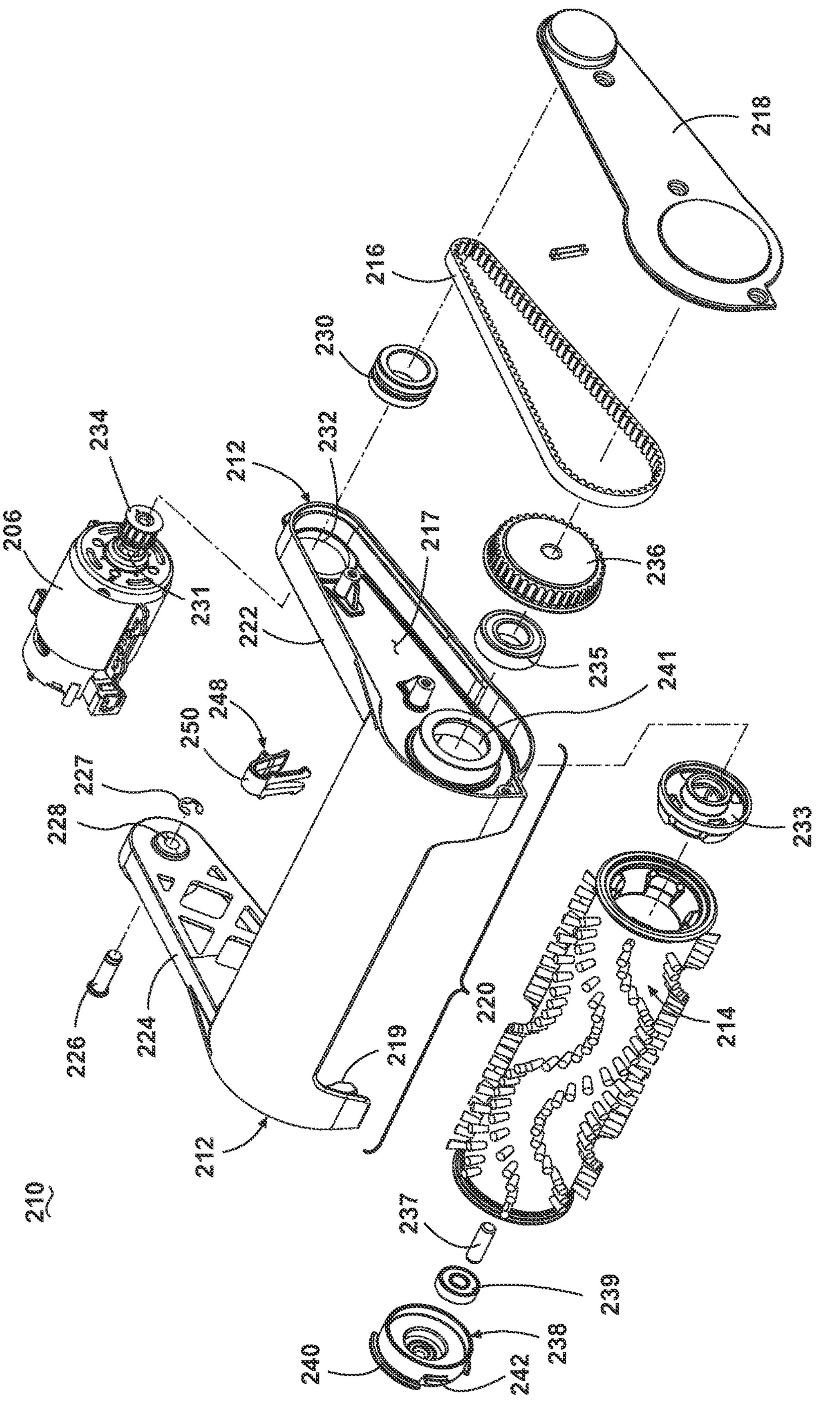
FIG. 14A is an exploded view of the brush carriage assembly and brush motor from FIG. 12.
Figure 14B:
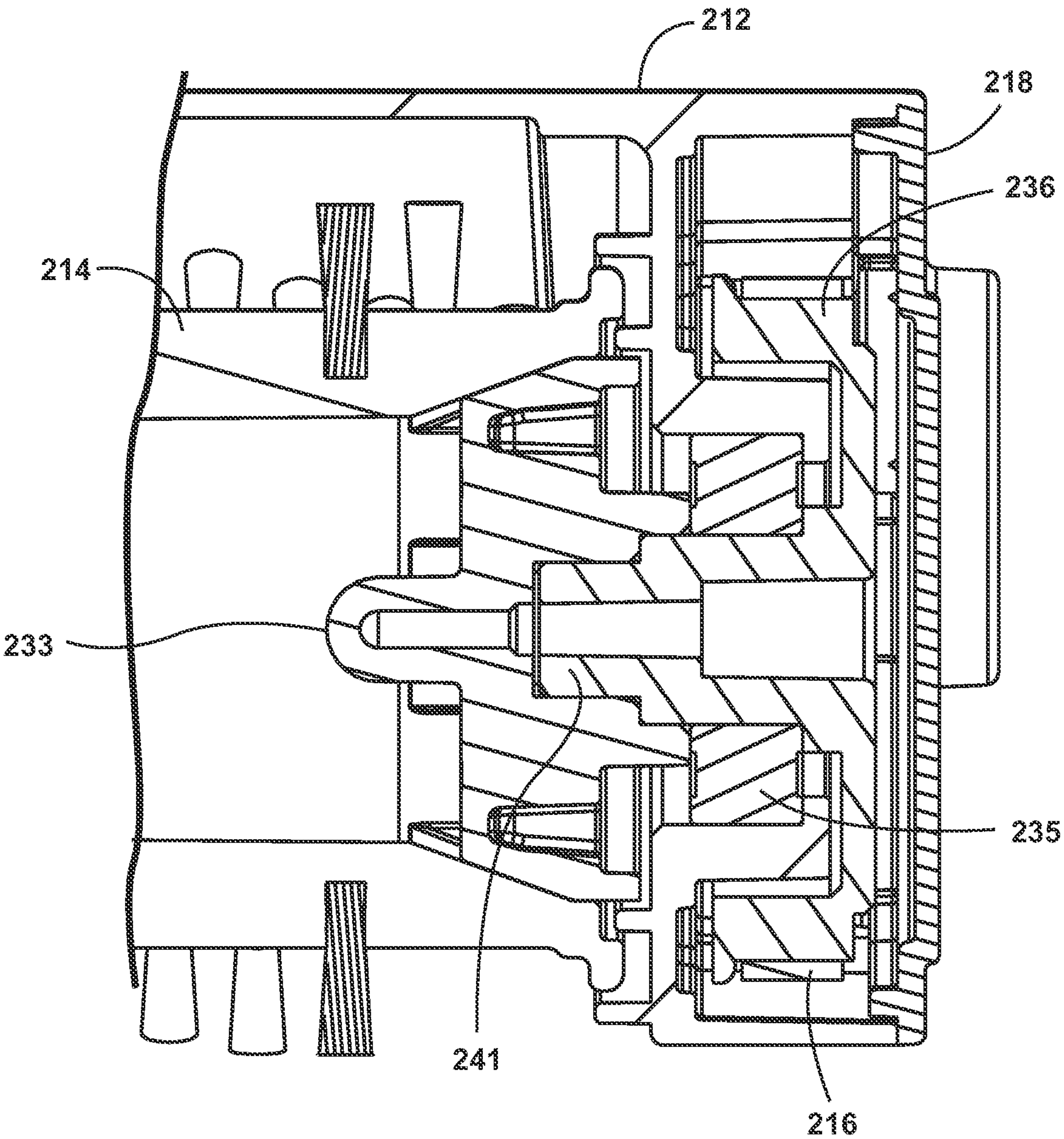
FIG. 14B is a detail, cross sectional view of a drive end of the brushroll taken along line 14A-14A of FIG. 12.
Figure 15:
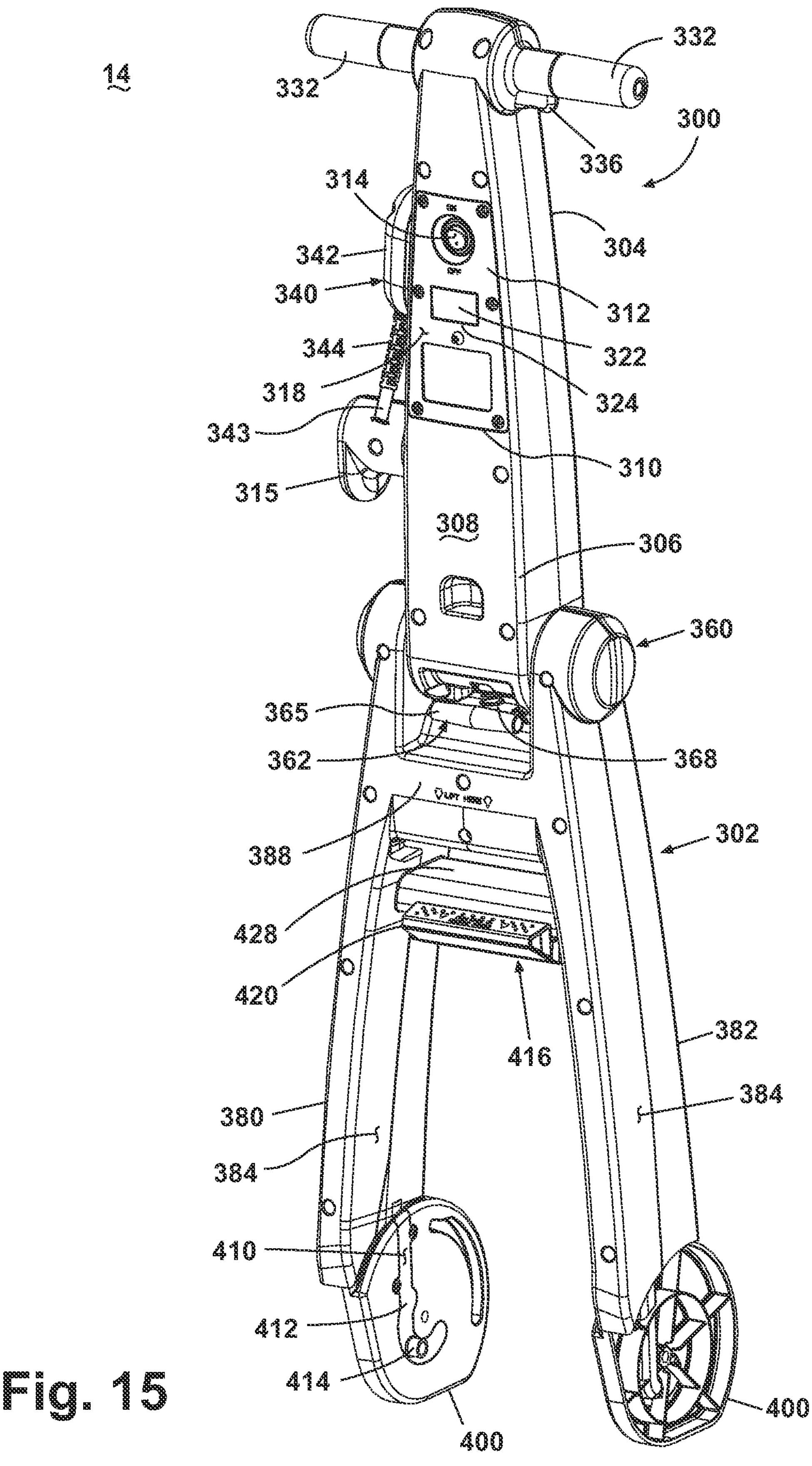
FIG. 15 is a rear, right perspective view of the handle assembly of the deep cleaner of FIG. 1.

At the forward section 162, the nozzle assembly 146 and the spray tip 165 are fixedly mounted to the base housing 140. The spray tip 165 is fluidly connected to the fluid distribution system by conventional means, such as through a flexible tube or hose (not shown). Referring to FIGS. 10-11, the nozzle assembly 146 includes a spring loaded nozzle guide 180 and nozzle body 182, and a handle 184 mounted to a nozzle housing 186. The nozzle assembly 146 is mounted within the nozzle housing 186 and the handle 184 can be gripped by a user during transport of the deep cleaner 10. As shown in FIG. 11, the nozzle guide 180 and nozzle body 182 are both formed by mating front and rear halves; however, either or both the nozzle guide 180 and nozzle body 182 can be formed as a unitary part. The nozzle guides 180 are mounted to the lower outer faces of the nozzle bodies 182, which are secured together by any suitable means such as mechanical fasteners, sonic welding, adhesive, or the like. A nozzle sleeve 187 sealingly connects a flexible, corrugated nozzle hose 188 to the upper edge of the nozzle body 182, and a nozzle flange 190 is sealingly affixed to the opposite end of the nozzle hose 188. An inlet 192 to the fluid recovery system is defined by the opening between the nozzle guides 180, and an outlet 194 of the nozzle assembly 146 portion of the fluid recovery system is defined by the upper opening in the nozzle flange 190. The nozzle assembly 146 further includes opposed nozzle slide pins 196 and two corresponding nozzle guide springs 198. Each slide pin 196 is vertically oriented with a lower end fixedly received in a complementary cavity 200 formed between the nozzle body 182 halves. Each slide pin 196 is configured to pass through a pair of coaxial holes 201 located in a pair of spaced stops 202 formed on both sides of the nozzle housing 186. The slide pins 196 further include a circumferential groove 197 adapted to receive a corresponding c-ring 199 that supports the lower end of the nozzle guide spring 198. Each slide pin 196 is slidably mounted within the holes 201 of the nozzle housing 186 which permits the nozzle body 182 and guide 180 to move vertically relative to the cleaning surface. The guide spring 198 surrounds the slide pin 196 and is compressibly mounted between the uppermost stop 202 at an upper end and the c-ring 199, which is positioned above the lowermost stop, at a lower end. The guide spring 198 is configured to bias the nozzle body 182 and guide 180 downwardly to engage the cleaning surface. This flexible mounting configuration ensures constant engagement between the inlet 192 and the cleaning surface, even as the nozzle assembly 146 passes over cleaning surfaces having varying heights such as dissimilar carpets, rugs, or the like. The leading and trailing edges of the nozzle guides 180 are radiused or rounded to glide across the cleaning surface and reduce user push and pull force required for maneuvering the deep cleaner 10 forward and backward during normal operation. Also, a rear nozzle cover 204 is affixed to the nozzle housing 186 to enclose the rear portion of the nozzle assembly 146.

The Brush Roll Assembly

Referring to FIGS. 10 and 12-14B, a brush motor 206, at least one support roller 208, and a brush carriage assembly 210 are mounted beneath the center section 161. The support rollers 208 are rotatably mounted about a transverse axis and support the base platform 20. The pivotally mounted brush carriage assembly 210 includes a brush housing 212, a rotatably mounted brushroll 214, a drive belt 216, and a belt cover 218. The brush housing 212 is a generally u-shaped member having a center section 220 that houses the rotatably mounted brushroll 214, a right support leg 222 and a left support leg 224. The right support leg 222 is a hollow member having a belt compartment 217 that is enclosed by the belt cover 218. The belt cover 218 is removably mounted to the right support leg 222 by threaded fasteners (not shown), snaps, or any other suitable attachment means.

The brush motor 206 is mounted to the base housing 140 and is sealingly enclosed within a brush motor cavity 229 formed between the base housing 140 and a brush motor cover 144, best seen in FIG. 10. The brush motor cover 144 prevents liquid and debris from entering the brush motor cavity 229 and contacting the motor 206. A support ring 230 is press-fit onto the distal end of the brush motor 206 frame and encircles a motor drive shaft 231 and a pinion gear 234 is located at the end of the brush motor drive shaft 231 for driving the belt 216. A groove around the circumference of the support ring 230 is clamped between corresponding recesses in the base housing 140 and the brush motor cover 144, thereby retaining the support ring 230 between the base housing 140 and the brush motor cover 144. The outer portion of the support ring 230 extends through a bearing hole 232 located in the distal end of the right support leg 222 and provides a bearing surface about which the support leg 222 rotates.

The brush carriage 210 assembly is configured to pivot with respect to the base housing 140 and rotates about the co-axial holes 228 and 232 formed in the right and left legs 224, 222 respectively. The left support leg 224 is pivotally retained by a pin 226 that is inserted through a hole 225 (FIG. 9) in the base housing 140. The shoulder of the pin 226 is seated against the base housing 140 and extends inwardly through the pivot hole 228 in the left support leg 224. A clip 227, such as a conventional c-clip, retains the pin 226 to the left support leg 224. The right support leg 222 is pivotally mounted by the support ring 230 in the bearing hole 232, as described above.

A brush drive cap 233 is fixed within the driven end of the brushroll 214 and is keyed to mate with a drive gear 236. A bearing 235 is seated in an aperture 241 in the right leg support 222 and rotatably supports the mated brush drive cap 233 and drive gear 236. The brushroll 214 is operably connected to brush motor 206 through the pinion gear 234 and drive belt 216, which is coupled to the drive gear 236 which in turn rotates the brush drive cap 233 and brushroll 214, as is well known in the extractor and vacuum cleaner arts. The belt 216 and gears 234 are enclosed between the belt cover 218 and the right support leg 222, within the belt compartment 217, to prevent debris from obstructing the drive train.

As best seen in FIGS. 13A-14B, the brush carriage assembly 210 also includes a twist and lock type connector, in the form of a keyed end cap 238 for selectively retaining and permitting facile removal of the brushroll 214 for cleaning or replacement. A bearing 239 secured within the end cap 238 is configured to rotatably receive a brush shaft pin 237 that protrudes from the non-driven end of the brushroll 214. The end cap 238 further includes a pair of opposed flanges 240 that extend partially around the perimeter of the end cap 238 and a pair of offset tabs 242. The tabs 242 are axially offset from the flanges 240 and together they sandwich an annular collar 244 located on the corresponding end 219 of the brush housing 212. A depressible, resilient finger 246 is integrally formed in the end 219 of the brush housing 212. The finger 246 forms a stop that is configured to engage the ends of the flange 240 to prevent rotation of the end cap 238. In coordination, the flanges 240, tabs 242, and finger 246 retain the end cap 238 to the brush housing 212.

The brush housing 212 further includes a retainer in the form of a detent tab 248, located on a rearward portion of the center section 220 that retains the brush housing 212 to the base housing 140. The detent tab 248 has a catch 250 that is retained by a snap head 252 (FIG. 10) beneath the base housing 140. When engaged, the detent tab 248 and snap head 252 retain the brush carriage 210 within the base assembly 12 when the deep cleaner 10 is elevated above the floor surface, such as during transport. The detent tab 248 and snap head 252 are configured so as not to limit the upward angular position of the brush carriage assembly 210, yet permitting sufficient downward angular rotation of the pivoting brush carriage assembly 210 to accommodate varying cleaning surface characteristics such as different carpet pile heights, area rugs, or the like.

The brush carriage assembly 210 is designed to be easily serviceable and removable. One means for fast and easy servicing of the components housed in the brush carriage assembly 210 is to simply pivot the assembly 210 down, thereby giving access to the components that may need to be serviced or cleaned. For example, the user may wish to remove the brushroll 214 for cleaning or replacement. To remove the brushroll 214 from the brush carriage assembly 210, the user pinches the detent tab 248 to release the catch 250 from the snap head 252 which drops the brush carriage assembly 210 away from the base housing 140 and exposes the end cap 238. The user then depresses the finger 246 inwardly to clear the end cap flange 240 and twists the end cap 238 relative to the brush housing 212. When the end cap 238 reaches a predetermined angular position, the end cap tab 242 aligns with a void 243 in the collar 244 of the brush housing 212 which allows the end cap 238 to be removed from the brush housing 212. After removing the end cap 238, the brushroll 214 is shifted axially and removed from the center section 220 of the brush housing 212. The brushroll 214 and end cap 238 can be reinstalled in the opposite order described herein for removal. Additionally, the drive belt 216 is easily removed and replaced when the brush carriage assembly 210 has been pivoted away from the base housing 140, as described above. In this lowered position, fasteners that affix the belt cover 218 to the right support leg 222 are accessible, and the belt cover 218 can be removed to access the belt 216. A new or cleaned belt 216 can be reinstalled in the opposite order described herein for removal.

Another means for servicing the brush carriage assembly 210 is to remove the entire assembly 210. To remove the brush carriage assembly 210, the user must release catch 250, as described above. The clip 227 is then removed, freeing the left support leg 224 from the pin 226. The brush carriage assembly 210 may then be shifted laterally and disengaged with the pin 226 and the motor 206 and pinion gear 234, freeing it for removal. The brush carriage assembly 210 can be reinstalled in the opposite order described herein for removal.

Referring back to FIG. 9, a brush motor 206 cooling air path B is formed partially within the mating base housing 140 and motor cover inner housing 168. An inlet opening 254 is formed in a protrusion on the backside of the rear wall 150 of the base housing 140. The inlet opening 254 fluidly connects the brush motor cavity 229 to draw cool, ambient air inside the rearward section 160 of the base housing 140. An outlet channel 256 formed along the rear wall 150 of the base housing 140 fluidly connects the transfer conduit 172 and the brush motor cavity 229. During operation, the vacuum motor and fan assembly 166 creates a working airflow within the fluid recovery system while simultaneously drawing cool, ambient air in through the inlet opening 254 and through the brush motor cavity 229 where heat is transferred from the operating brush motor 206 to the cooling air flow passing therethrough. The heated brush motor cooling air flow passes through the outlet channel 256 and into the transfer conduit 172 where it merges with the working air of the fluid recovery system prior to entering the motor and fan assembly 166 inlet via the previously described air pathway 156.

Additional commonly known components mounted to the base housing 140 include: a printed circuit board, a safety valve, and various seals and gaskets (not shown).

The Handle Assembly

Figure 16:
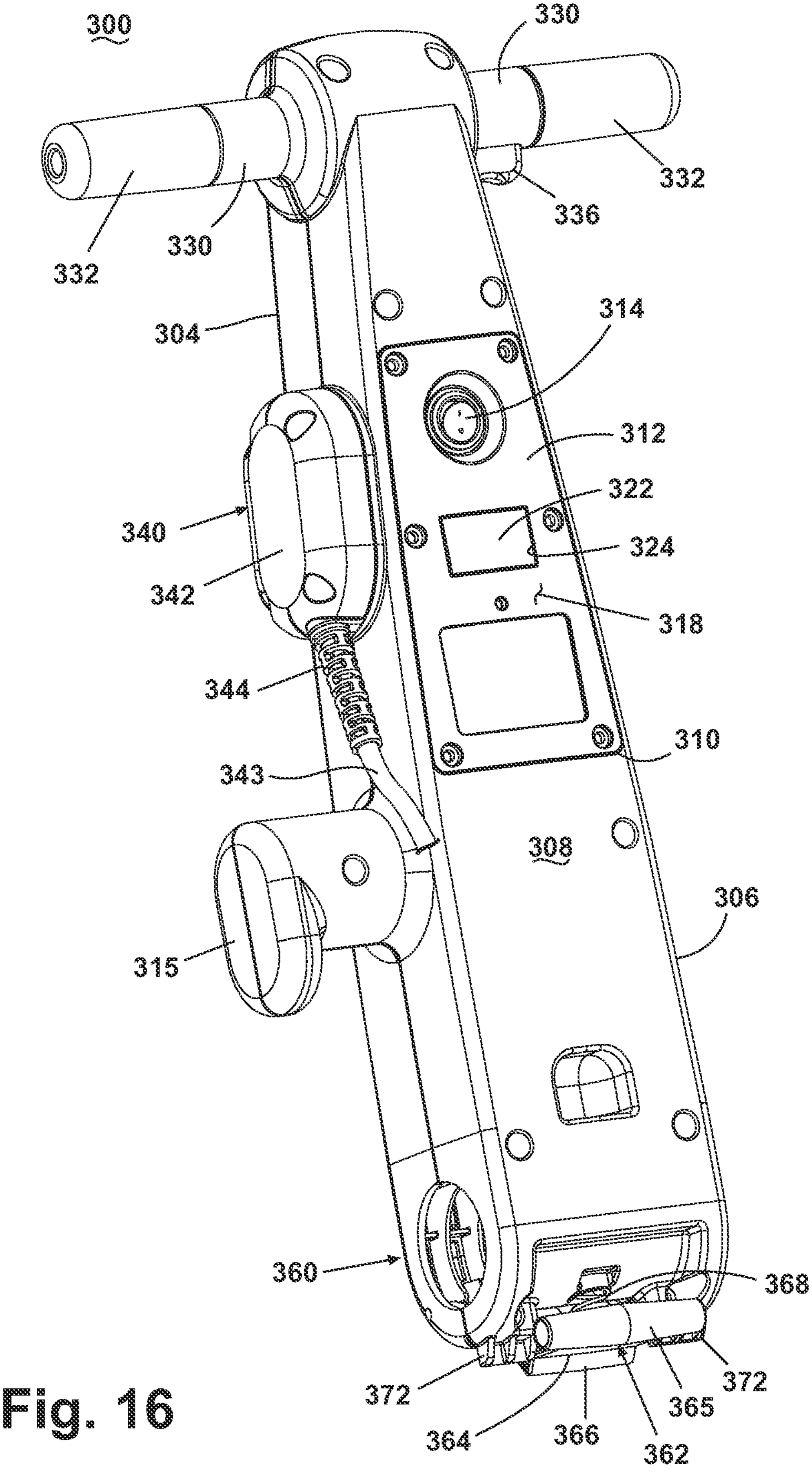
FIG. 16 is a rear, left perspective view of an upper handle from the handle assembly of FIG. 15.
Figure 17:
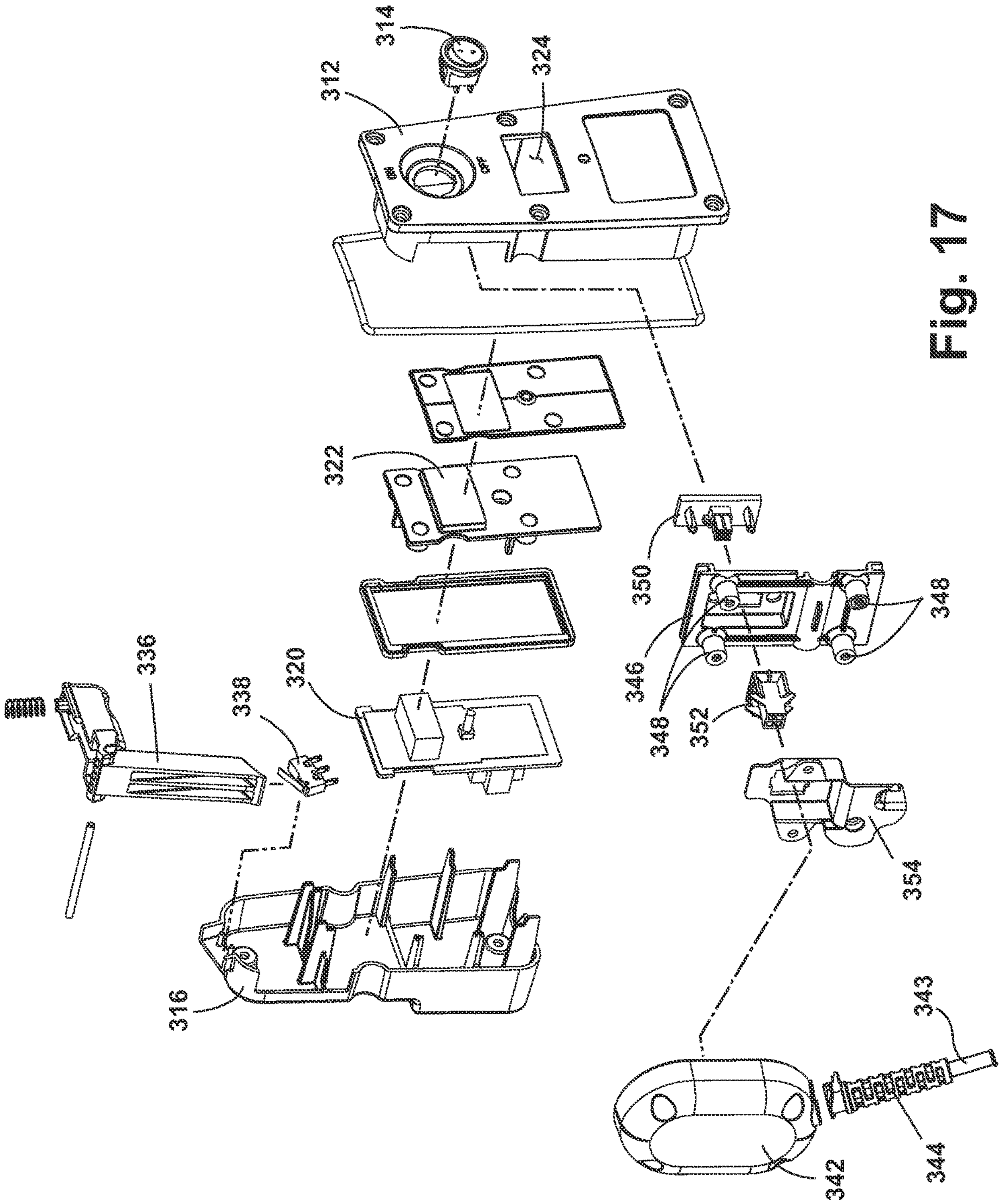
FIG. 17 is an exploded view of the components housed inside the upper handle of FIG. 16.

Referring now to FIGS. 15-19, the handle assembly 14 includes an upper handle 300 pivotally connected to a lower handle 302 at an upper pivot joint 360. The upper handle 300 is selectively foldable about the joint 360 into a compact storage position shown in FIG. 18. The lower handle 302 is pivotally connected to the base assembly 12. The upper handle 300 includes a housing formed by a forward shell 304 and a rearward shell 306 that mate to form an upper handle cavity 308 therebetween. An electrical shroud 312 is mounted to an opening 310 in the rearward shell 306. A power switch 314 is mounted in the electrical shroud 312 and is electrically connected to the motor and fan assembly 166, the pump assembly 164, the brush motor 206, a spray tip valve 167 (FIG. 2), and a power cord 343 mounted to the upper handle 300. The power cord 343 can be wrapped around a cord wrap 315 and an upper handle grip 332. The power cord 343 includes an elastic band (not shown) configured to wrap around the bundled cord 343 to prevent it from tangling and to maintain a tidy appearance during storage. An electrical housing 316 within the upper handle cavity 308 mates to the electrical shroud 312 and defines an electrical cavity 318 therebetween. Referring specifically to FIG. 17, a timer board 320 includes a conventional timer integrated circuit and an hour meter display and is mounted in the electrical cavity 318. The timer board 320 is configured to track total deep cleaner 10 run time. A transparent lens 322 fitted between the timer board 320 and a window 324 in the electrical shroud 312 permits the hour meter display of the timer board 320 to be viewed by the user.

Referring back to FIG. 16, the upper portion of the upper handle 300 includes a T-shaped handle grip for maneuvering the deep cleaner 10 across the surface to be cleaned. The handle grip includes opposed tubular handle bars 330 that extend horizontally from the upper handle 300. Optionally, soft, elastomeric comfort grips 332 can surround the handle bars 330 to provide comfortable gripping surfaces for the user's hands. The upper handle 300 further includes a fluid trigger 336 pivotally mounted between the mating shells 304, 306 and operatively coupled to a trigger microswitch 338 that is partially enclosed within the electrical cavity 318. As will be discussed in more detail hereinafter, the trigger switch 338 is electrically coupled to the spray tip valve 167 (FIG. 2) and is configured to selectively activate the valve 167 to dispense the cleaning solution onto the surface to be cleaned.

The Modular Replaceable Power Cord

Referring now to FIGS. 16-17, the upper handle 300 further includes a modular, replaceable power cord and connector assembly 340. The power cord and connector assembly 340 includes a cord housing 342 to which the power cord 343 and a cord bend relief 344 are mounted to a lower portion thereof. A connector bracket 354 is fixedly mounted inside the cord housing 342 and configured to retain a conventional female electrical connector 352. An interface plate 346 is mounted in the upper handle cavity 308 and is retained by mounting features (not shown) in the mating rearward and forward shells 304, 306. The interface plate 346 includes a plurality of screw bosses 348 configured to removably mount the cord housing 342 via conventional threaded fasteners (not shown). A male electrical connector 350 is fixedly attached to the interface plate 346 and extends toward the cord housing 342. Upon installation of the power cord and connector assembly 340, the male and female electrical connectors 350 and 352 engage thereby connecting the power cord 343, which is electrically connected to the female connector 352, and an electrical system 354 (see FIG. 23) of the deep cleaner 10, which is electrically connected to the male connector 350. To replace the power cord and connector assembly 340, the user removes the threaded fasteners that retain the cord housing 342 to the interface plate 346 and pulls the cord housing 342 away from the upper handle 300, thereby disengage the male connector 350 and the female connector 352. The reverse process is followed to replace the power cord and connector assembly 340.

Figure 18:
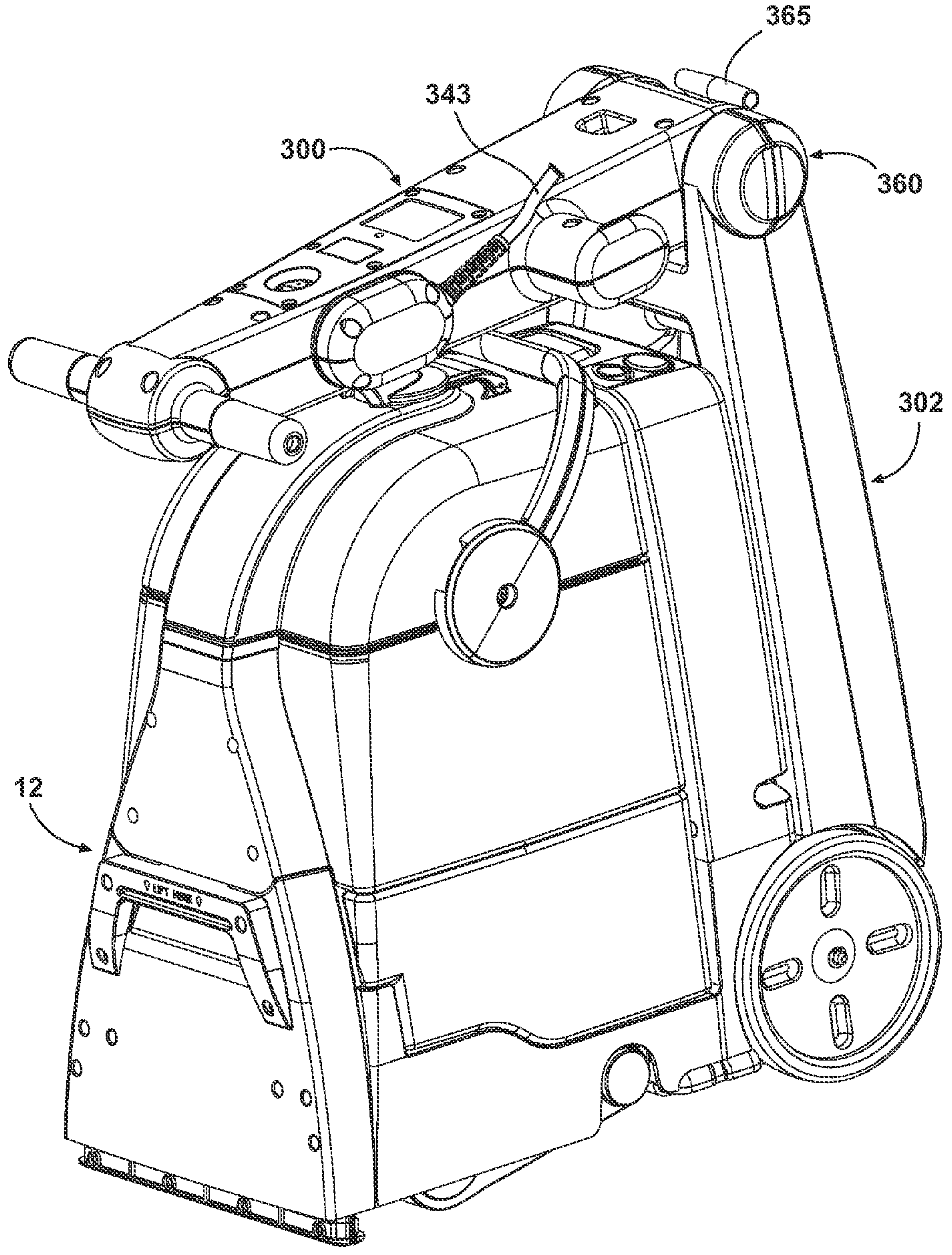
FIG. 18 is a perspective view of the deep cleaner of FIG. 1, illustrating the folded-down storage position of the handle assembly.

As shown in FIG. 18, the upper handle 300 is pivotally mounted to the lower handle 302 at an upper pivot joint 360 and is adapted to be folded forward for storage. Referring back to FIG. 16, an upper release mechanism 362 releasably locks the upper handle 300 in an upright position during normal use. The upper release mechanism 362 includes an upper handle release lever 364 having a grip portion 365 and a stop bump 366, an upper handle pivot pin (not shown), and an upper handle release spring 368. The upper handle release lever 364 is pivotally mounted to a lower portion of the forward shell 304 by the upper handle pivot pin. The upper handle release spring 368 is mounted between the upper handle release lever 364 and the rearward shell 306 and biases the release lever 364 downwardly. The stop bump 366 engages a ramp 370 (FIG. 19) in the lower handle 302 to lock the upper handle 300 in the upright position. To release the upper handle 300, the user pivots the grip portion 365 of the upper handle release lever 364 upwardly, which retracts the stop bump 366 thus disengaging the ramp 370 and permitting the upper handle 300 to pivot forward relative to the lower handle 302. A pair of tangs 372 on the lower portion of the upper handle 300 limit rearward rotation of upper handle 300 with respect to the lower handle 302.

Figure 19:
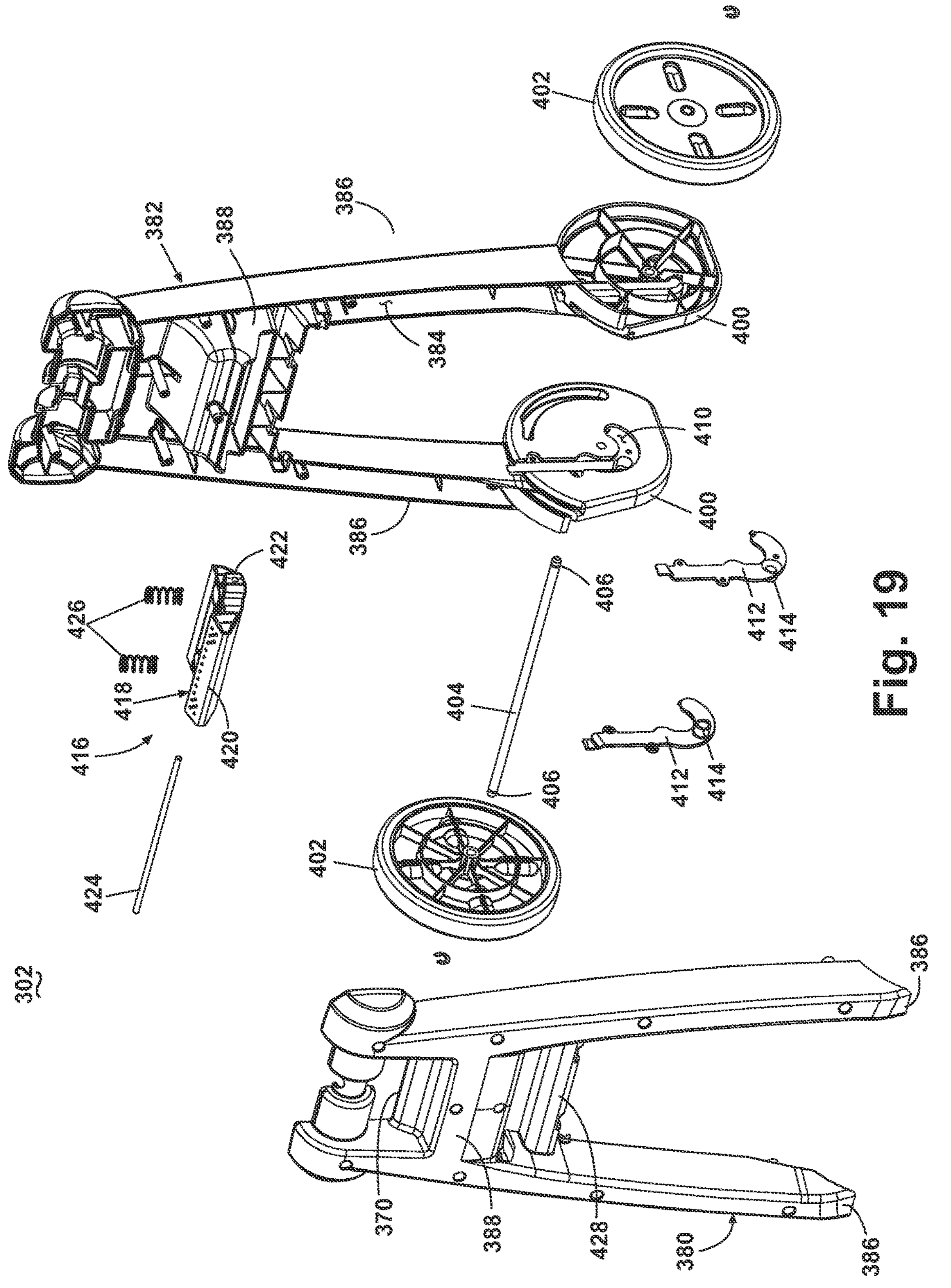
FIG. 19 is an exploded view of a lower handle and wheels from the handle assembly of FIG. 15.

Referring to FIG. 19, the lower handle 302 includes a housing formed by a rearward shell 380 and a forward shell 382 that mate for form a lower handle cavity 384 therebetween. The rearward and forward shells 380, 382 are generally U-shaped with downwardly extending spaced legs 386 joined by a transverse wall 388. The lower handle 302 further includes the ramp 370 mentioned above, which is formed in an upper portion of the transverse wall 388. The handle assembly 14 is pivotally connected to the base assembly 12 through a pair of trunnions 400 disposed at the ends of the legs 386 on the forward shell 382. Two wheels 402 are rotatably mounted to the outer sides of the trunnions 400 on an axle 404. Bearings 406 are received in openings 408 (FIG. 9) formed in the base housing 140. The axle 404 extends through the base housing 140 and the wheels 402 are mounted on the ends of the axle 404, as is commonly known. The wheels 402 partially support the base assembly 12 on the surface to be cleaned, and the axle 404 provides a pivot axis for pivotal movement of the handle assembly 14 relative to the base assembly 12. The inner sides of the trunnions 400 further includes a cord routing channel 410 enclosed by a mating cord routing cover 412. Conductor wires (not shown) are routed from within the lower handle cavity 384 into the cord routing channel 410, and through a grommet 414 on the cord routing cover 412, into the base assembly 12 and connected to components mounted therein. The wiring path protects the conductor wires and prevents abrasion when the handle assembly 14 is pivoted during use.

A lower release mechanism 416 releasably locks the lower handle 302 to the base assembly 12 in an upright, storage position. The lower release mechanism 416 includes a release pedal 418 having a grip portion 420 and a catch 422, a lower release pivot pin 424, and at least one lower handle release spring 426. The lower handle release pedal 418 is pivotally mounted on the lower release pivot pin 424, which is retained in the lower handle cavity 384 between the rearward and forward shells 380, 382. The release pedal 418 is downwardly biased by the lower handle release springs 426, which are mounted between the release pedal 418 and a rung 428. The rung 428 is formed in part by each of the rearward and forward shells 380, 382 and spans the legs 386 of lower handle 302. The catch 422 selectively engages a rib 430 (FIG. 10) on an upper rear portion of the motor cover outer housing 170 (FIG. 10) to restrict rearward rotation of the handle assembly 14. To recline the lower handle 302, the user pivots the grip portion 420 of the lower handle release pedal 418 downwardly, which lifts the catch 422 away from the rib 430 and frees the lower handle 302 to pivot rearwardly relative to the base assembly 12 to an operative position.

The Fluid Delivery System

Figure 20:
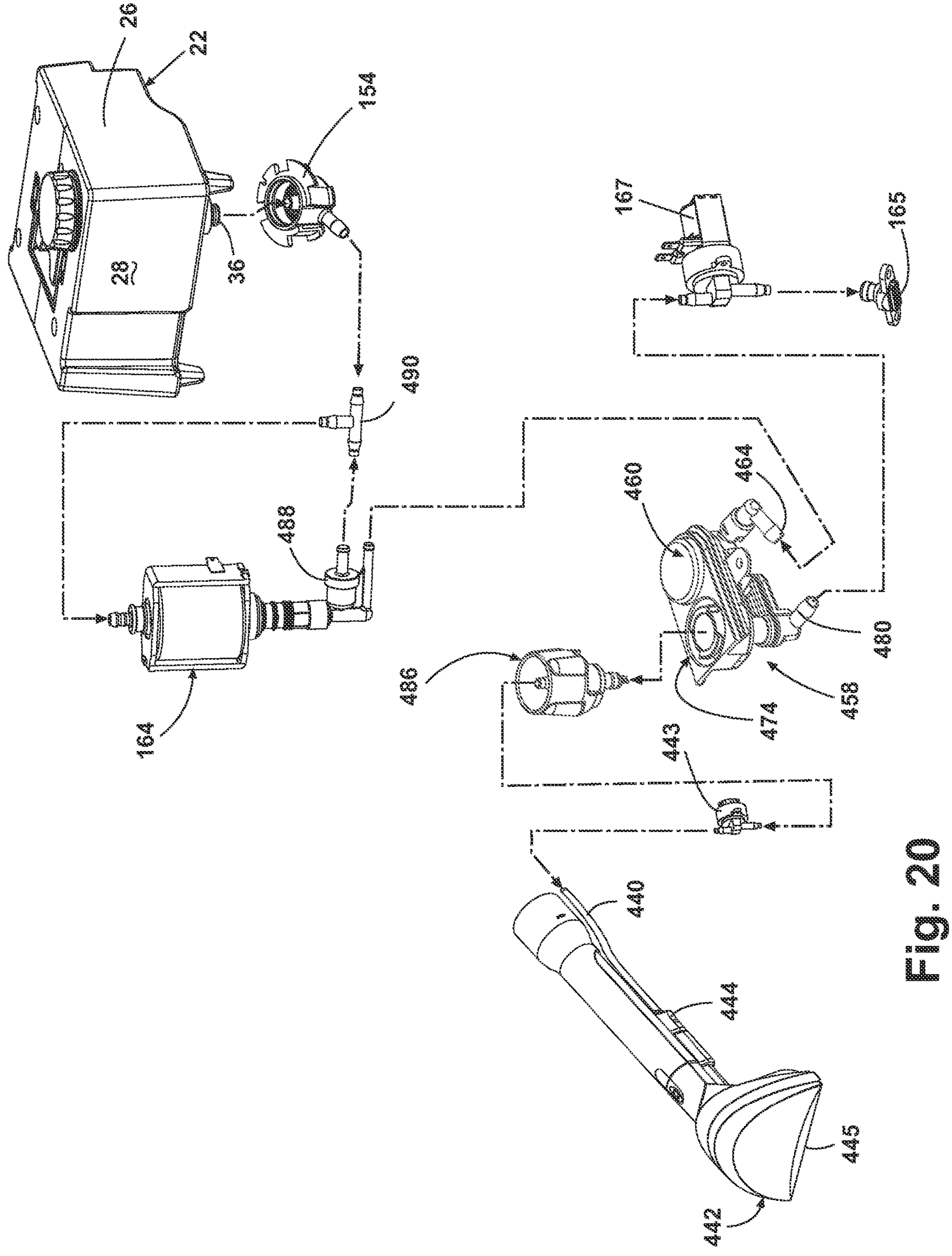
FIG. 20 is a schematic view of a fluid distribution system of the deep cleaner of FIG. 1.

The fluid delivery system stores the cleaning fluid and delivers the cleaning fluid to the surface to be cleaned. For visual clarity, the various electrical and fluid connections within the fluid delivery system are not shown in the drawings described above but are depicted schematically in FIG. 20. Referring now to FIG. 20, the fluid delivery system includes the solution tank 26 for storing a cleaning fluid. The cleaning fluid can include one or more of any suitable cleaning fluids, including, but not limited to, water, concentrated detergent, diluted detergent, and the like. Preferably, the cleaning fluid includes a mixture of water and concentrated detergent. When the solution supply tank assembly 22 is mounted to the base assembly 12 (FIG. 1), the valve seat 154 opens the normally closed valve 36, which dispenses cleaning fluid downstream fluid delivery system. An exemplary valve and valve seat are disclosed in U.S. Pat. No. 6,467,122, which is incorporated herein by reference in its entirety. The cleaning fluid flows from the solution tank 26 to the pump assembly 164, which pressurizes the cleaning fluid.

Figure 21A:
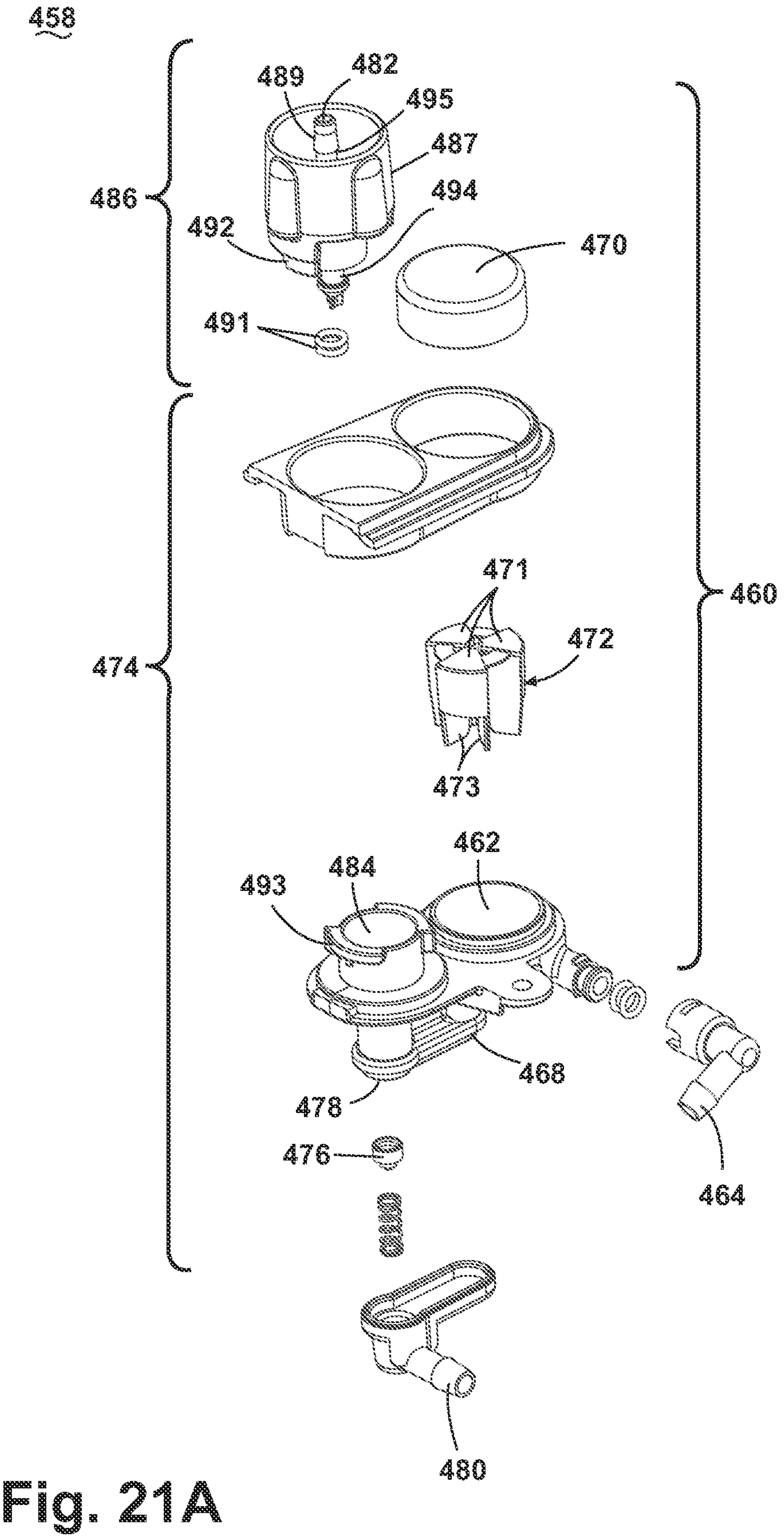
FIG. 21A is an exploded view of a diverter from the fluid distribution system of FIG. 20.
Figure 21B:
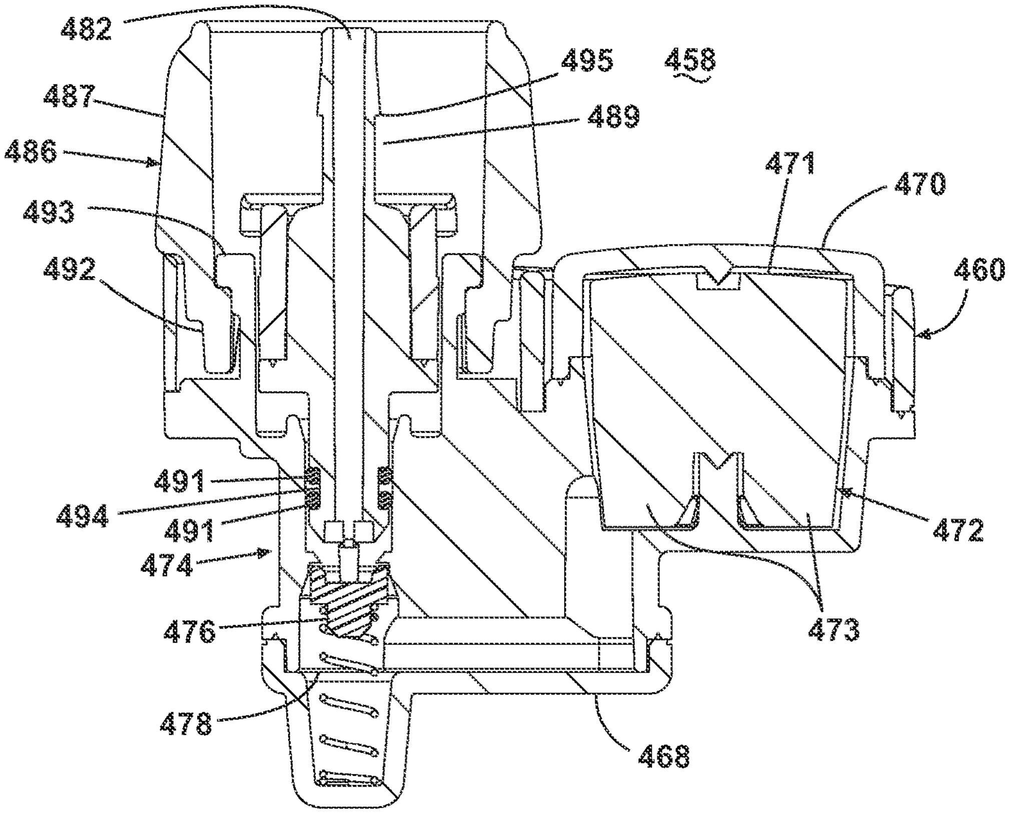
FIG. 21B is a cross-sectional view of the diverter of FIG. 21A, illustrating a floor cleaning mode.
Figure 21C:
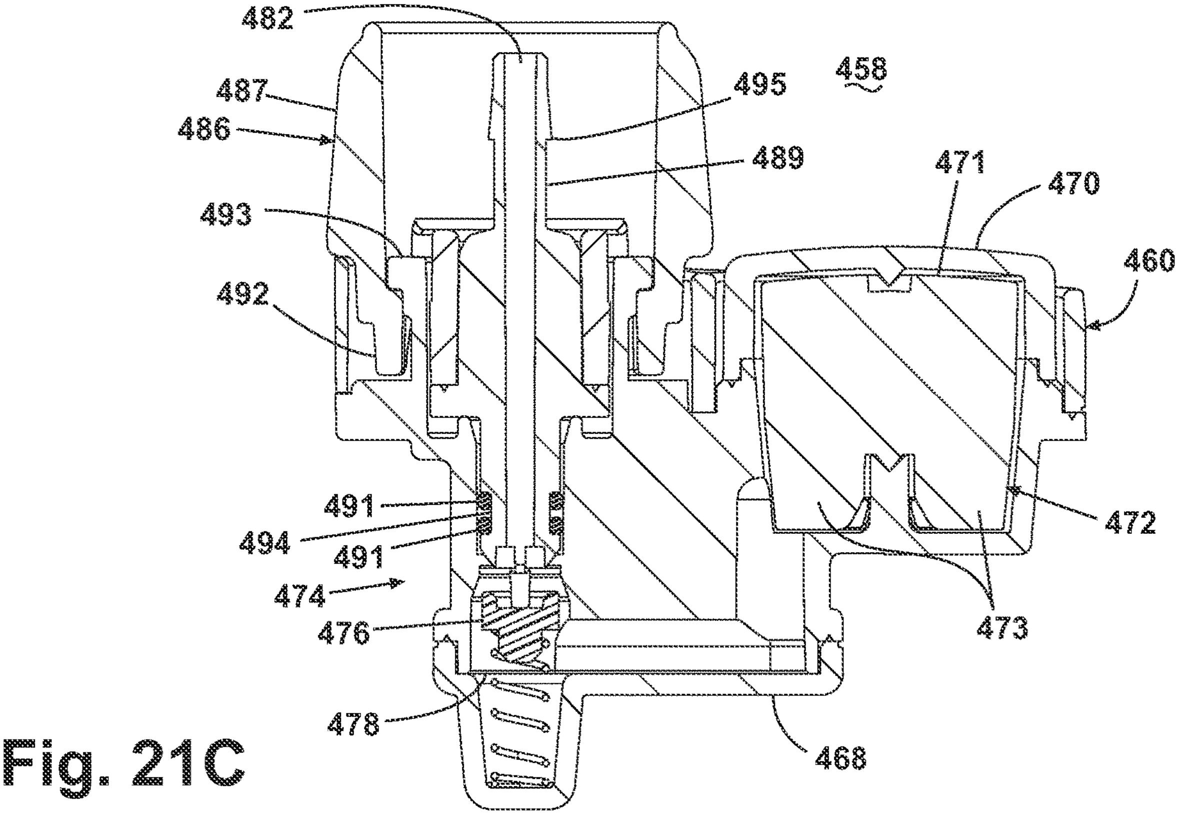
FIG. 21C is a cross-sectional view of the diverter of FIG. 21A, illustrating an above-floor cleaning mode.

Pressurized fluid exits the pump assembly 164 and flows into a diverter 458 that diverts the cleaning fluid to one of an accessory tool handle 442 and the spray tip valve 167 located in the base assembly 12. The diverter 458 includes a fluid inlet 464, a fluid outlet 480 and a selectively engageable upholstery hose outlet (not shown). The diverter further includes a flow indicator 460 and a flow coupler 474. As can be seen in FIG. 8, the diverter 458 is mounted to an upper surface of the motor cover inner housing 168. The flow indicator 460 indicates fluid flow to the spray tip 165. Referring to FIGS. 21A-C, the flow indicator 460 includes a circular body 462 having an inlet 464, an outlet 468, and a transparent lid 470. The indicator body 462 houses a rotatably mounted impeller 472 that overlies the fluid inlet 464 and the fluid outlet 468. The impeller 472 includes radial paddles 473 that protrude downwardly from the top surface thereof. The impeller 472 further includes colored blades 471 located on the top surface of the impeller 472. The tangential fluid inlet 464 is located in a lower sidewall of the body 462 and the opposed outlet 468 is disposed in a bottom wall of the body 462 positioned approximately 180 degrees from the inlet. The lid 470 is transparent for viewing the fluid flowing into the flow indicator 460 and the rotating blades 471. Pressurized fluid from the pump assembly 164 enters the fluid inlet 464 tangentially and flows along the sidewall pushing the radial paddles 473 and thus rotating the impeller 472 and causing the blades 471 to spin, indicating to the user that the cleaning fluid is flowing. The spinning fluid continues to rotate the impeller 472 until flowing out of the body 462 through outlet 468.

The flow coupler 474 includes a mechanical valve 476, an inlet 478, an outlet 480, and an accessory outlet 482. The inlet 478 is fluidly connected to the outlet 468 of the flow indicator 460. The mechanical valve 476 is spring biased upwardly in a normally closed position, which blocks the accessory outlet 482 and opens a flow path between the inlet 464 and outlet 480 to the spray tip valve 167 (FIG. 2), as shown in FIG. 21B which illustrates the floor cleaning mode. The spray tip valve 167 includes a solenoid valve that is controlled by the microswitch 338 in the handle assembly 14. A mechanically actuated valve is also suitable. When the user depresses the fluid trigger 336 on the handle assembly 14, the microswitch 338 opens the spray tip valve 167 to deliver the pressurized cleaning fluid to a spray tip 165 for dispensation onto the surface to be cleaned. Optionally, the spray tip 165 can be located so as to dispense the cleaning fluid onto the brushroll 214 for delivering the cleaning fluid to the surface to be cleaned.

The diverter 458 selectively directs the cleaning fluid to the accessory tool handle 442 during above-floor cleaning mode, as illustrated in FIG. 21C. An accessory hose solution tube 440 includes a male coupler assembly 486 configured for insertion into a mouth 484 of the flow coupler 474. The male coupler assembly 486 includes a cylindrical cap 487, a hollow plunger pin 498, and O-ring seals 491. The cap 497 includes bayonet hooks 492 that protrude downwardly from the cap sidewalls and are configured to engage corresponding ears 493 on the mouth 484 of the flow coupler 474. The plunger pin 489 is permanently affixed to the cap 487 and includes a groove 494 configured to receive the conventional O-ring seals 491 at one end. A barb 495 at the opposite end is configured for insertion into the solution tube 440.

To divert cleaning fluid from the outlet 480 to the accessory outlet 482, the coupler assembly 486 is secured to the mouth 484 of the flow coupler 474. The bayonet hooks 492 on the cap 487 engage the ears 493 on the mouth 484 and the bottom end of the plunger pin 489 depresses the mechanical valve 476, which opens the flow path between the inlet 464 and the accessory outlet 482 while simultaneously blocking the outlet 480. The O-ring seals 491 prevent leakage while the cleaning fluid is diverted through the flow coupler 474, through the male coupler assembly 486, and into the solution tube 440 that is fluidly connected to the accessory tool handle 442 having an accessory tool spray tip 441 mounted therein. The accessory tool handle 442 includes a valve 443 operably connected to an accessory tool trigger 444. The valve 443 is selectively opened when the user depresses the accessory tool trigger 444 to deliver the pressurized cleaning fluid through the accessory tool spray tip 441 and onto the surface to be cleaned.

Referring back to FIG. 20, the fluid delivery system also includes a recirculation loop fluidly connected to the continuously operating pump assembly 164 and adapted to prevent a high pressure or overload condition. A normally closed pressure relief valve 488 is fluidly connected to pump outlet. The pressure relief valve 488 includes a high pressure vent opening that is fluidly connected to a T-fitting 490 via conventional solution tubing. The T-fitting 490 is also fluidly connected to the pump inlet and the valve seat 154. In a normal pressure condition, the cleaning fluid flows from the pump assembly 164 passed the pressure relief valve 488, through the pump outlet, to the diverter 458. In a high pressure or overload condition, fluid pressure builds up between the pump assembly 164 and either of the closed spray tip valve 167 or closed accessory tool handle valve 443. The high pressure fluid is vented through the pressure relief valve 488, through the T-fitting 490 to the inlet side of the pump assembly 164 where it is drawn through the pump assembly 164 thus completing a recirculation loop. The recirculation cycle continues until either of the spray tip valve 167 or closed accessory tool handle valve 443 are opened to distribute cleaning fluid onto the surface to be cleaned and thus relieving pressure within the fluid distribution system.

As will be recognized by one skilled in the extractor art, the fluid delivery system can include various modifications. For example, an in-line heater may be included for heating the cleaning fluid. Furthermore, the pump assembly 164 is optional and can be eliminated in lieu of a commonly known gravity fed fluid delivery system. Additionally, the spray tip 165 can be replaced by a plurality of spray tips or an alternate fluid distributor, such as a perforated distribution bar.

The Fluid Recovery System

As mentioned above, the deep cleaner 10 includes the fluid recovery system for removing the spent cleaning fluid and dirt from the surface to be cleaned and storing the spent cleaning fluid and dirt. It is contemplated that the surfaces in the fluid recovery system be treated with antimicrobial coating to prevent microbial growth and associated malodors. The fluid recovery system includes the motor and fan assembly 166 that generates a working air flow through the extractor 10.

In the floor cleaning mode, a working air path originates at the nozzle inlet 192, and extends through the fluid flow path in the nozzle assembly 146, the nozzle conduit section 44, inlet conduit 74, and through the recovery tank inlet 76 into the air/fluid separation chamber where it passes over the separator plate 86. The recovered dirt and water fall into the recovery chamber 42. The working air path continues, as shown in FIG. 6, around the separator plate 86 into the outlet chamber 112 from the exit opening 118, through recovery tank conduit 100, into the recovery tank outlet 80, and through the transfer conduit 172 and the exhaust air pathway 156 (FIG. 9) before reaching the motor and fan assembly 166 inlet. The air is exhausted from the motor and fan assembly 166 through the exhaust duct 176 to exhaust air outlet conduit 158 where it is exhausted beneath the deep cleaner 10. A perforated duct cover 178 beneath the base housing 140 receives the exhaust air and disperses it across the width of the deep cleaner 10.

Figure 22:
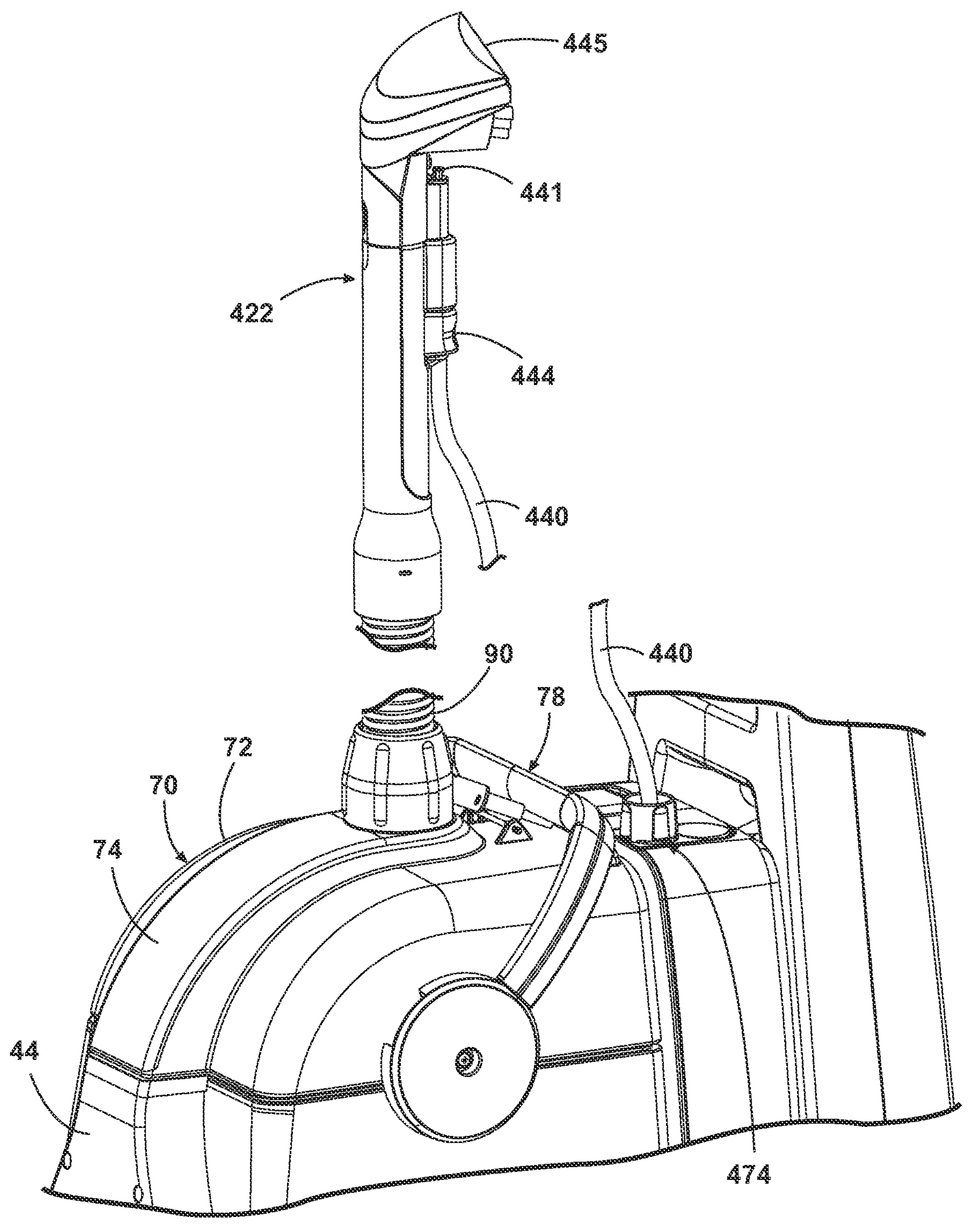
FIG. 22 is a detail, perspective view of an accessory tool handle and accessory hose of the deep cleaner of FIG. 1, illustrating an above-floor cleaning mode.

When the deep cleaner 10 is used in the accessory cleaning mode, the accessory hose 90 is installed in the aperture 88, as illustrated in FIG. 22, and a working air path originates at an accessory tool nozzle inlet 445 on the accessory tool handle 442, through the accessory hose 90 and into the recovery tank inlet 76 and then flowing through the remainder of the working air path is as previously described.

An exemplary description of the operation of the deep cleaner 10 follows. It will be appreciated by one of ordinary skill in the extractor art that the operation can proceed in any logical order and is not limited to the sequence presented below. The following description is for illustrative purposes only and is not intended to limit the scope of the present disclosure in any manner.

In operation, the user prepares the deep cleaner 10 for use by filling the solution tank 26 with at least one cleaning fluid. The user first must remove the recovery tank assembly 24 from atop the solution supply tank assembly 22 by pivoting the recovery tank carry handle 78 and simultaneously lifting the recovery tank assembly 24 and attached lid assembly 70 from the solution supply tank assembly 22, thereby separating the nozzle conduit section 44 from the nozzle assembly 146. Once the recovery tank assembly 24 and lid assembly 70 are removed, they can be set on a flat surface.

To fill the solution tank 26 with cleaning fluid, the user removes the solution supply tank assembly 22 from the base assembly 12 by simply lifting the solution supply tank assembly 22 by the carry handle 34, thereby separating the valve 36 from the valve seat 154. Once the solution supply tank assembly 22 is removed from the base assembly 12, the fill cap 30 is removed from the tank inlet 32 and the solution tank 26 is filled with cleaning fluid. Alternatively, the solution tank 26 can be filled whilst mounted to the base assembly 12. After the solution tank 26 is filled, the user replaces the fill cap 30 on the tank inlet 32 and mounts the solution supply tank assembly 22 to the base assembly 12, thereby coupling the valve 36 with the valve seat 154, which opens the valve 36 and fluidly connects the solution tank 26 with the fluid distribution system.

Figure 23:
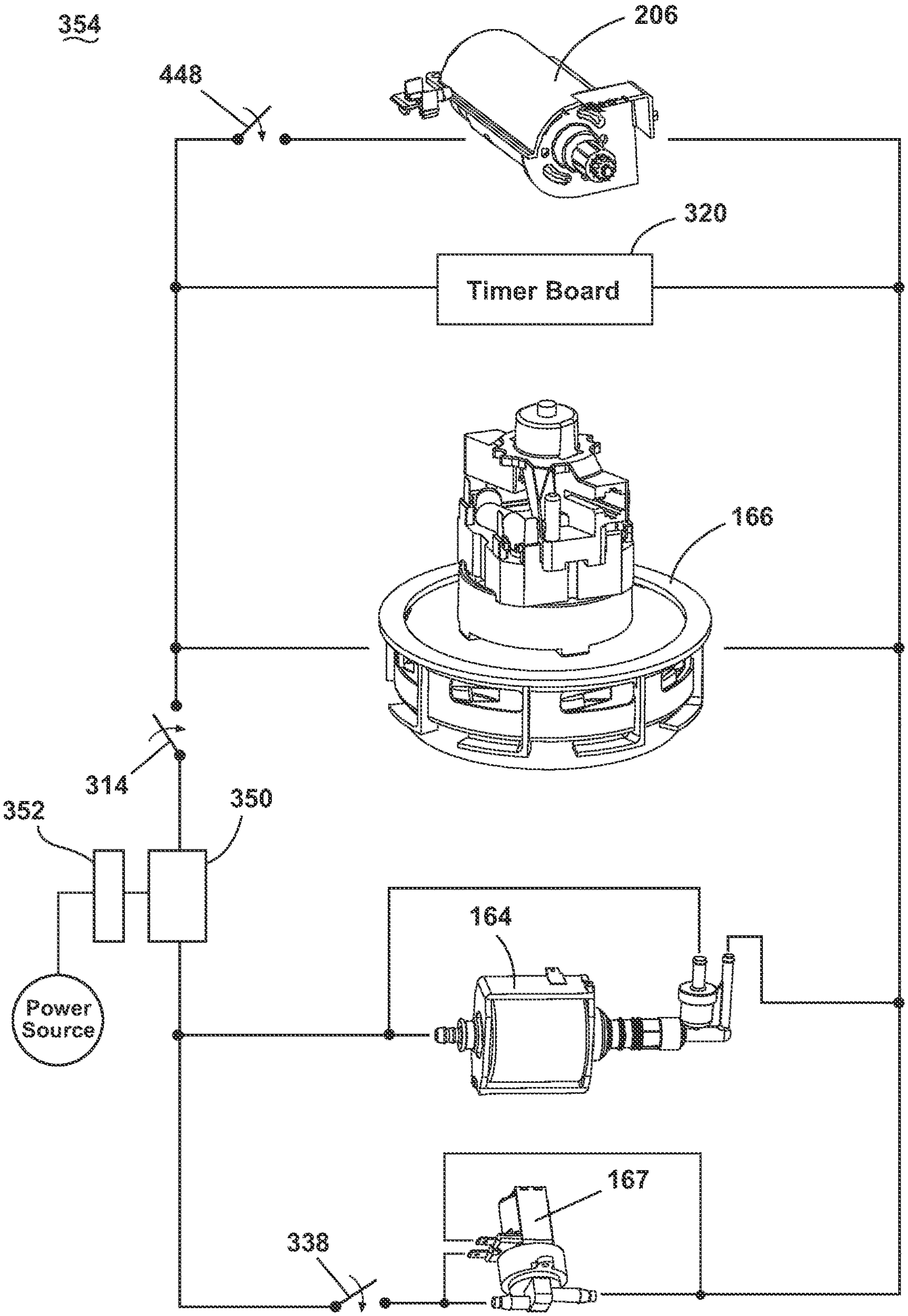
FIG. 23 is a schematic view of an electrical system of the deep cleaner of FIG. 1.

To operate the deep cleaner 10 in the floor cleaning mode, the user actuates the main power switch 314 to supply power from an electrical outlet to energize the motor and fan assembly 166, the pump assembly 164, and the brush motor 206, as shown schematically in FIG. 23. Power to the brush motor 206 is selectively controlled by a brush motor switch 448 mounted within the base assembly 12. The normally closed brush motor switch 448 is configured to supply power to the brush motor 206 when the handle assembly 14 is reclined during use. When the handle assembly 14 is returned to the upright storage position, a cammed groove (not shown) inside the trunnion 400 engages a brush motor switch actuator (not shown) that is configured to depress a brush motor switch 448 actuator button to open the brush motor switch 448, thus cutting power to the brush motor 206. When the user reclines the handle assembly 14, the cammed groove inside the trunnion 400 rotates and disengages the motor switch actuator (not shown) thus returning the brush motor switch 448 to its normally closed position and supplying power to the brush motor 206 for floor cleaning.

With the handle assembly 14 reclined and brush motor 206 powered, the user grasps the comfort grip 332 on the bar 330 and moves the deep cleaner 10 along the surface to be cleaned while selectively applying the cleaning fluid when desired by depressing the fluid trigger 336. The cleaning fluid is dispensed through the spray tip 165, and the surface to be cleaned is agitated by the brushroll 214. The spent cleaning fluid and dirt on the surface to be cleaned are removed through the nozzle inlet 192 and flow through the working air path described above into the recovery chamber 42, where the spent cleaning fluid and dirt are separated from the working air. The working air continues along the working air path out of the recovery chamber 42 to the motor and fan assembly 166, and the exhaust air from the motor and fan assembly 166 leaves the base assembly 12 through exhaust air outlet conduit 158 to a perforated duct cover 178 beneath the base housing 140 that disperses the warm exhaust air across the width of the deep cleaner 10 in the manner described in detail above. Distributing the exhaust air onto the cleaning surface in this manner aids in heating and drying the surface that is being cleaned.

The recovery tank assembly 24 is quickly and easily emptied by first grasping the hand grip portion 92 of the carry handle 78 and lifting the recovery tank assembly 24 off of the solution supply tank 22. Next, the lid assembly 70 is unlocked and removed from the tank housing 40 by rotating the carry handle 78 forward, which disengages the cam surfaces 96 from the cam followers 98 and permits lid removal. The user then grasps the recovery tank housing 40 and tips the tank housing 40 to discard the spent cleaning fluid and dirt to an appropriate receptacle or waste drain.

To operate the extractor 10 in the accessory cleaning mode, the user removes the hose cap 84 from the inlet conduit 74 and snaps the accessory hose 90 into the aperture 88, thereby fluidly connecting the accessory hose 90, accessory tool handle 442, and accessory tool nozzle inlet 445 to the fluid recovery system. The male coupler 486 of the accessory hose solution tube 440 is inserted into the mouth 484 of the flow coupler 474, thereby fluidly connecting the accessory tool spray tip 441 in the accessory tool handle 442 to the fluid distribution system. When desired, the user depresses the accessory tool trigger 444 to dispense cleaning fluid through the accessory tool spray tip 441 to the surface to be cleaned. The spent cleaning fluid and dirt on the surface to be cleaned are extracted through the accessory tool nozzle inlet 445 of the accessory tool handle 442, into the recovery tank inlet 76, and flow through the working air path described above into the recovery chamber 42, where the spent cleaning fluid and dirt are removed from the working air.

As the motor and fan assembly 166 operates with the deep cleaner 10 in either the floor cleaning mode or accessory cleaning mode, cooling air for the brush motor 206 flows through a passageway for cooling the brush motor 206. Following cooling air path B as described above, cooling air enters the brush cavity 229 through the inlet opening 254, which fluidly connects the brush motor cavity 229 to cool ambient air. The outlet channel 256 fluidly connects the brush motor cavity 229 with the transfer conduit 172. The vacuum motor and fan assembly 166 draws the cool ambient air in through the inlet opening 254, through the brush motor cavity 229 where the air cools the brush motor 206, and then through the outlet channel 256. The heated air joins the working air from the fluid recovery system in the transfer conduit 172 prior to entering the motor and fan assembly 166.

The solution tank 26 fill cap 30 is configured to selectively draw ambient air into the solution tank 26, while preventing solution from flowing out the inlet hole 50 in the fill cap 30. The inlet hole 50, nipple (not shown) on the fill cap 30, tether tube 54, and nipple 60 on the tether base 56 form a fluid flow path between ambient air and the solution tank 26. In the steady state, the check valve 58 covers the opening at the base of the nipple 60, preventing solution from flowing up the tether tube 54 and out the inlet hole 50. However, during operation, as the solution is distributed to the surface to be cleaned, pressure within the solution tank 26 builds. When the pressure differential between the ambient air and the tank builds to a predetermined level, the check valve 58 opens the fluid flow path to the solution tank 26, thereby drawing ambient air into the solution tank 26.

While not shown in the drawings, one example of the present disclosure includes a fragrance receptacle that holds a scented material in gelled, crystallized, or other suitable forms. The fragrance receptacle is provided in or near the exhaust path of the deep cleaner 10 so that when the deep cleaner 10 is operated, fragrance is dispersed into the air. This feature provides positive olfactory feedback to the user while operating the deep cleaner 10 to clean a surface.

The Brush Carriage Assembly Module

Figure 24:
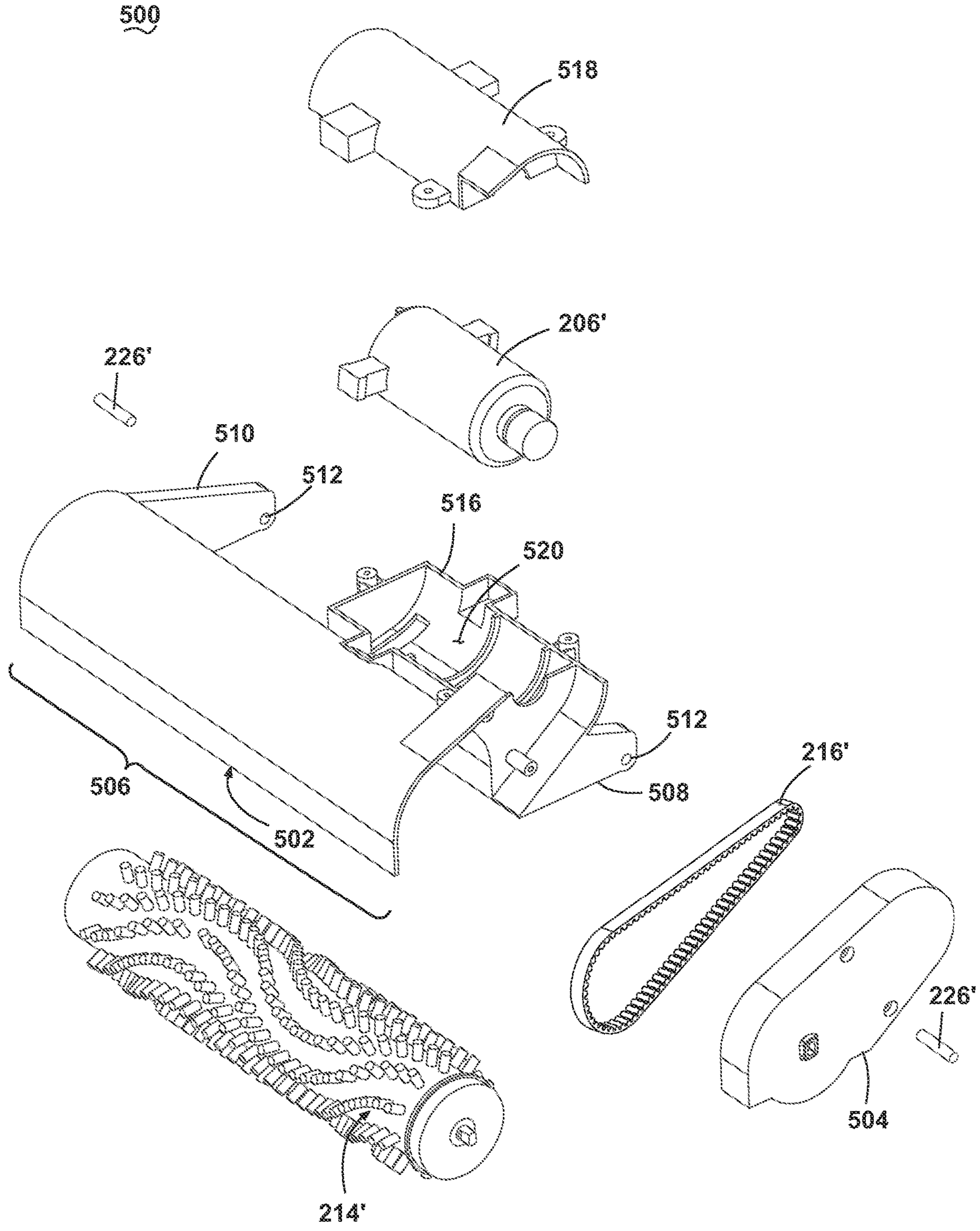
FIG. 24 is an exploded view of an alternate example of a brush carriage assembly of the deep cleaner of FIG. 1.
Figure 25:
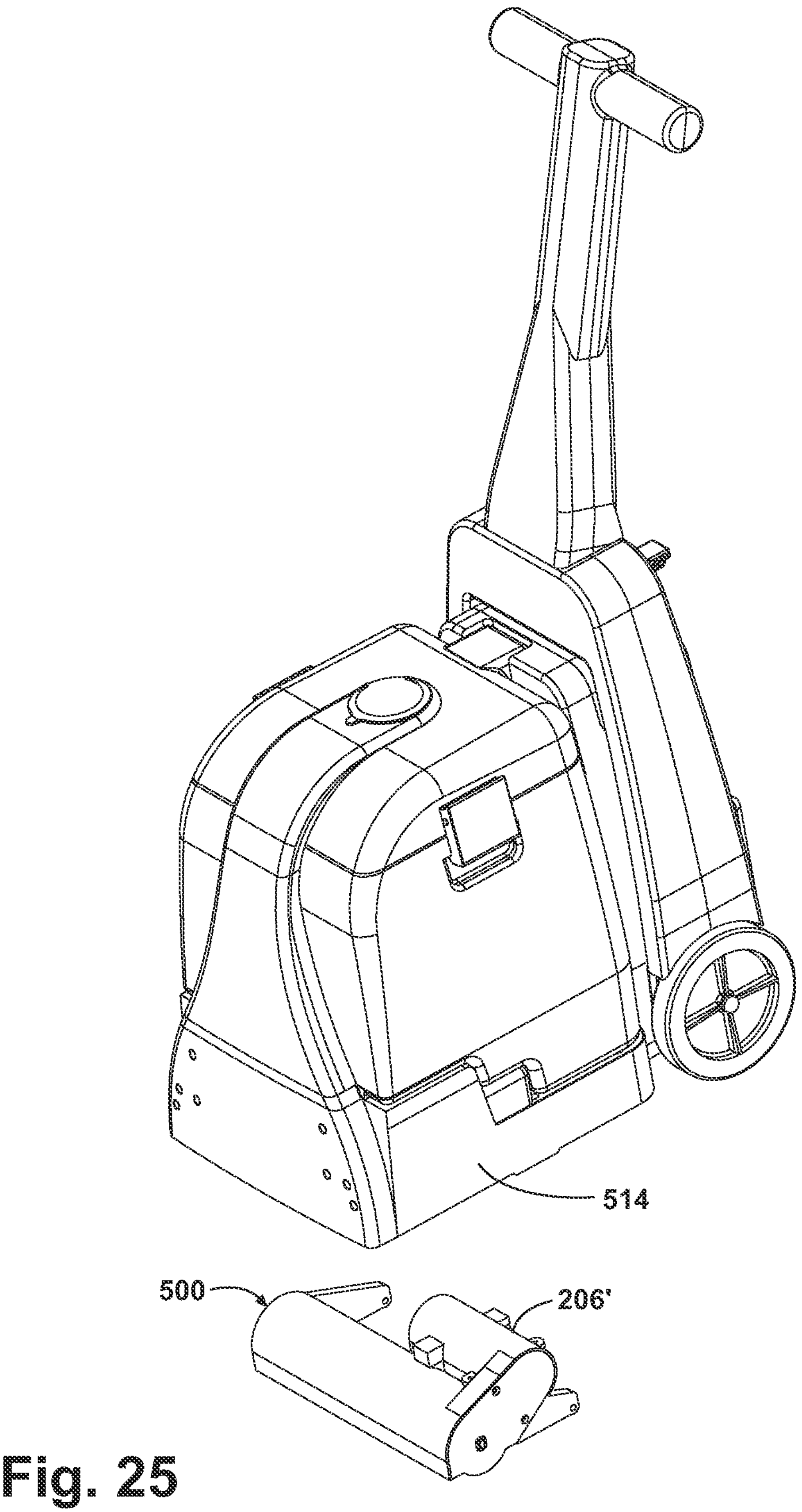
FIG. 25 is a partially exploded view of the alternate brush carriage assembly and an alternate base housing of the deep cleaner of FIG. 1.

As shown in FIGS. 24-25, in an alternate example where similar elements from the first example are labeled with the same reference numerals but with a prime (') symbol, a brush motor 206' is mounted to a brush carriage assembly 500. The brush carriage assembly 500 includes a pivotably mounted brush housing 502, a brushroll 214', a drive belt 216', and a belt cover 504. The brush housing 502 is a generally U-shaped member having a center section 506 under which the brushroll 214' is rotatably mounted, and having a right leg 508 and a left leg 510. The legs 508, 510 are each pivotally retained by a pin 226' that is inserted through a hole 512 and is retained in a base housing 514. The right leg 508 is a hollow member that is enclosed by the belt cover 504. The belt cover 504 is removably mounted to the right leg 508 by threaded fasteners (not shown), snaps, or any other suitable attachment means.

A brush motor cradle 516 is integrally formed within the brush housing 502 and is positioned adjacent to and rearward of the center section 506. The brush motor 206' is enclosed by a brush motor cover 518 that is sealingly affixed to the brush motor cradle 516, thus defining a sealed brush motor cavity 520 that prevents liquid and debris from contacting the motor 206'. The brushroll 214' is operably connected to the brush motor 206' via the drive belt 216', as is well known in the extractor and vacuum cleaner arts. Together, the belt cover 504 and right leg 508 enclose the belt 216' to prevent debris from obstructing the drive train.

The brush carriage assembly 500, including the integral brush motor 206' mounted thereto, provides easy access to the brushroll 214', belt 216', and brush motor 206' for cleaning and service, similar to the method described above with respect to the prior example. To access or remove these components, the brush carriage assembly 500 is pivoted downward, below the surface of the base housing 514, to provide access to the belt cover 504, brushroll 214', and brush motor 206'. The belt cover 504 can be removed to access to the belt 216', and the brush motor cover 518 can be removed to access to the brush motor 206'. Furthermore, the modular arrangement provides a mechanism for easy, rapid replacement of the entire brush carriage assembly 500 for servicing, also similar to the method described above with respect to the prior example.

One benefit provided by mounting the brush motor 206' to the brush carriage assembly 500 is increased downward force applied to the brushroll 214'. The weight of the motor 206' increases the total mass in front of the pivot point where the brush carriage assembly 500 is mounted. This increase in mass increases the downward force that the brushroll 214' applies to the surface to be cleaned, thereby improving the cleaning performance of the carpet extractor 10.

The Rental Method

Figure 26:
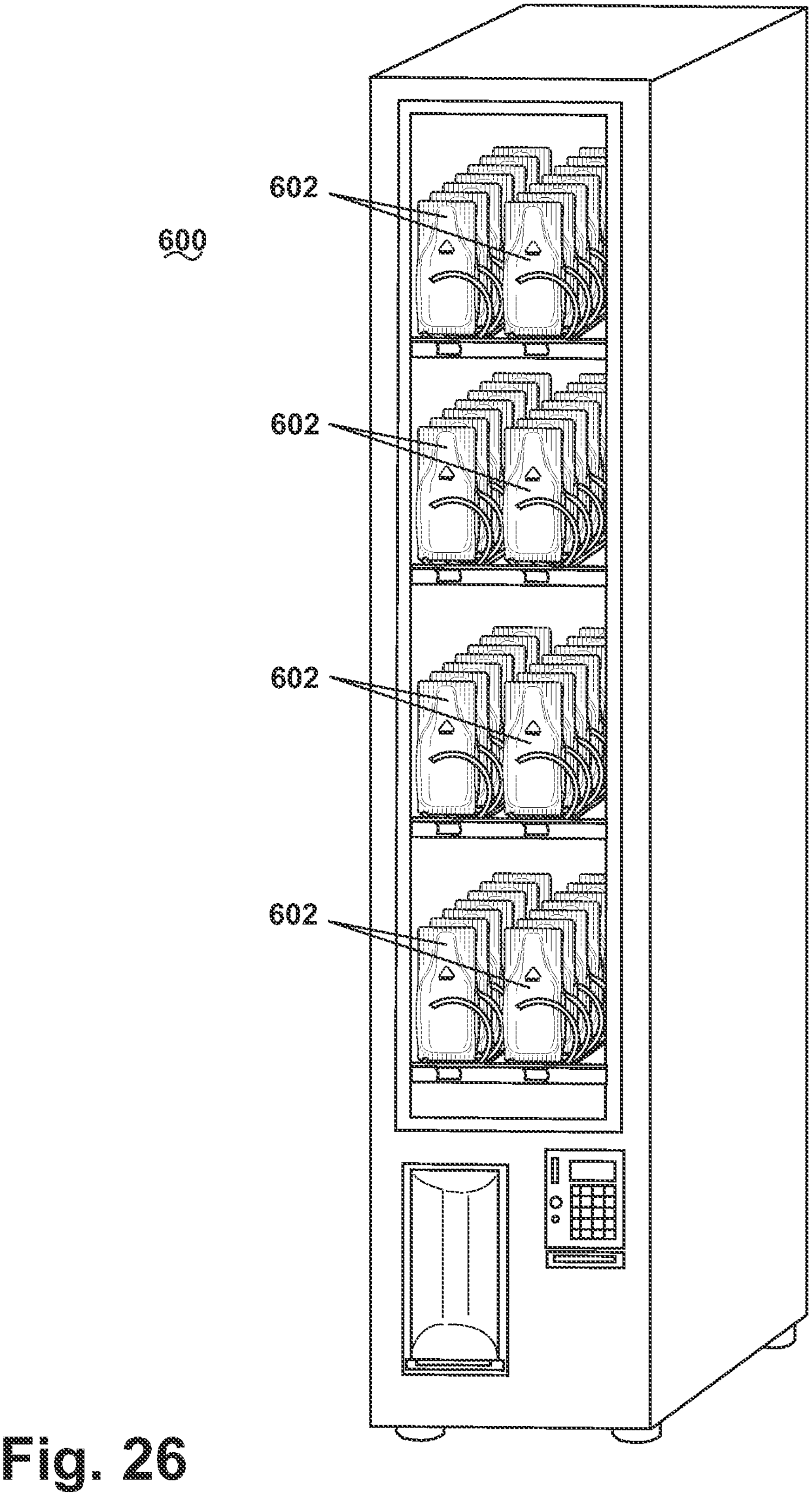
FIG. 26 is a perspective view of a vending machine and cleaning formulation pouches for use with the deep cleaner of FIG. 1.

In another example of the present disclosure as shown in FIG. 26, a business method includes at least one carpet extractor 10 is provided at a retail facility. The vendor offers the at least one carpet extractor 10 for lease for a predetermined period of time and leases the carpet extractor 10 for the predetermined period of time. Further, a vending machine 600 that is configured to dispense cleaning formulations packaged in single-use packages 602 is provided at the retail rental facility. The single use packages 602 can be one or combinations of pouches, plastic containers, or metal containers. The single use packages are offered for sale along with the rental of the carpet extractors. Preferably, the single use packages are positioned adjacent to the location of the carpet extractors or where the carpet extractors are offered for rental.

Accordingly, the user can rent the deep cleaner 10 and purchase the desired cleaning formulation(s) simultaneously. The vending machine 600 includes a commonly known screw-feed style dispensing system. The packages 602 contain a variety of chemical formulations and additives; for example, a variety of concentrated formulas tailored for specific uses and offering various cleaning attributes, a base formula, such as BISSELL® Fiber Cleansing™ to be combined with different packages 602 containing additives, such as various fragrances, Scotchgard™ protectant, or peroxygen formulas, for performing various cleaning functions. Traditional, commercially available chemicals can also be provided in packages 602 offered in the vending machine 600, such as pet stain and odor formula containing enzymes or OxyPro®, for example. Similar to traditional vending machines, the consumer can view all of the different sets of cleaning formulation options available in the vending machine, insert payment including cash or credit card, and then select the desired packages 602. The vending machine 600 then dispenses the selected package(s) 602 such that they drop down into a compartment for retrieval by the user.

While the invention has been specifically described in connection with certain specific embodiments thereof, it is to be understood that this is by way of illustration and not of limitation, and the scope of the appended claims should be construed as broadly as the prior art will permit. Reasonable variation and modification are possible within forgoing description and drawings without departing from the scope of the invention, which is set forth in the accompanying claims.

What is claimed is:

1. A carpet extractor comprising:

an open top recovery tank for collecting and storing spent cleaning fluid and dirt removed from a surface to be cleaned, the recovery tank including an upper rim around the open top and a pair of opposed, outwardly projecting cam followers on exterior sides of the recovery tank adjacent the upper rim;

a lid having a lower rim that mates with the recovery tank upper rim to close the open top of the recovery tank and a pair of journals; and a handle rotatably mounted to the lid between a closed position and an open position, the handle having at its outer ends two opposed cam mounting sockets that each have a cam surface and a socket on an interior face thereof, and the handle is rotatably mounted to the lid by the sockets and the journals;

wherein the cam surfaces are configured to interface with the cam followers to releasably lock the lid to the recovery tank when the handle is in the closed position and to release the lid from the recovery tank and to raise the lid from the recovery tank when the handle is in the open position.

2. The carpet extractor of claim 1 wherein the closed position is defined by the handle in a rearwardly rotated position.

3. The carpet extractor of claim 1 wherein the open position is defined by the handle in a forward rotated position.

4. The carpet extractor of claim 1 wherein the cam followers ride along the cam surface during a rotation of the handle.

5. The carpet extractor of claim 4 wherein the cam surfaces are further configured to urge the raising of the lid slightly from the recovery tank when the cam followers ride along the cam surfaces during a rotation of the handle to the open position.

6. The carpet extractor of claim 1 wherein the cam surfaces are configured to only disengage the cam followers when the handle is in the open position.

7. The carpet extractor of claim 1 wherein the recovery tank is a generally cubic tank.

8. The carpet extractor of claim 1 wherein the recovery tank includes a forward face and a nozzle conduit section on the forward face.

9. The carpet extractor of claim 8 wherein the lid includes an upper surface and a recovery tank inlet conduit overlying the upper surface.

10. The carpet extractor of claim 9 wherein the nozzle conduit section is fluidly connected with the recovery tank inlet conduit when the lid is locked to the recovery tank.

11. The carpet extractor of claim 1 wherein the handle includes a hand grip portion.

12. The carpet extractor of claim 1, further comprising a base assembly and wherein the recovery tank is provided on the base assembly.

13. The carpet extractor of claim 12, further comprising a solution supply tank assembly provided on the base assembly and wherein the recovery tank is removably mounted on the solution supply tank assembly.

14. The carpet extractor of claim 1 wherein the recovery tank includes a tank housing.

15. The carpet extractor of claim 14, further comprising a lid seal located between the lid and the tank housing.

16. A carpet extractor comprising:

a recovery tank for collecting and storing the spent cleaning fluid and dirt removed from a surface to be cleaned, the recovery tank including an open top, an upper rim around the open top, and a pair of cam followers adjacent the upper rim, the cam followers projecting outwardly from exterior sides of the recovery tank in opposite directions;

a lid comprising a pair of journals and a lower rim that mates with the upper rim of the recovery tank to close the open top of the recovery tank; and a handle rotatably mounted to the lid via the pair of journals and rotatable between a closed position and an open position, the handle comprising a pair of cam surfaces;

wherein the cam surfaces are configured to interface with the cam followers to releasably lock the lid to the recovery tank when the handle is in the closed position and to raise the lid slightly from the recovery tank and release the lid from the recovery tank when the handle is in the open position.

17. A carpet extractor comprising:

a recovery tank for collecting and storing spent cleaning fluid and dirt removed from a surface to be cleaned, the recovery tank including an open top, an upper rim around the open top, and a plurality of cam followers adjacent the upper rim, the cam followers projecting outwardly from exterior sides of the recovery tank in opposite directions;

a lid comprising a plurality of journals and a lower rim that mates with the upper rim of the recovery tank to close the open top of the recovery tank; and a handle rotatably mounted to the lid via the plurality of journals and rotatable between a closed position and an open position, the handle comprising a plurality of cam surfaces, wherein the cam followers ride along the cam surfaces during rotation of the handle between the closed position and the open position;

wherein the cam surfaces are configured to interface with the cam followers to releasably lock the lid to the recovery tank when the handle is in the closed position and to raise the lid from the recovery tank and release the lid from the recovery tank when the handle is in the open position; and wherein the cam surfaces are configured to urge the raising of the lid from the recovery tank as the cam followers ride along the cam surfaces during a rotation of the handle to the open position.

18. The carpet extractor of claim 17 wherein the handle comprises a hand grip portion having opposing ends comprising sockets, whereby the handle is rotatably mounted to the lid via coupling the sockets with the journals of the lid, and wherein the cam surfaces extend at least partially around the sockets.

19. The carpet extractor of claim 17 comprising:

a base assembly having a suction nozzle adjacent the surface to be cleaned; and a motor and fan assembly configured to generate a working air flow through the suction nozzle, the motor and fan assembly in fluid communication with a recovery tank outlet;

wherein the recovery tank comprises a nozzle conduit section in fluid communication with the suction nozzle, the lid comprises a recovery tank inlet conduit in fluid communication with the nozzle conduit section when the lid is locked to the recovery tank;

whereby the motor and fan assembly is in fluid communication with the suction nozzle via at least the nozzle conduit section, the recovery tank inlet conduit, and the recovery tank outlet.

20. The carpet extractor of claim 19 wherein the lid comprises the recovery tank outlet, wherein removal of the lid from the recovery tank simultaneously removes the recovery tank outlet and the recovery tank inlet conduit.

* * * * *